（12）United States Patent
Pierle

(10) Patent No.: US 8,498,177 B2
(45) Date of Patent: Jul. 30, 2013

(54) DETERMINING A POSITION OF A GEOLOGICAL LAYER RELATIVE TO A WAVELET RESPONSE IN SEISMIC DATA

(75) Inventor: Thomas Andrew Pierle, Conroe, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 397 days.

(21) Appl. No.: 12/860,717

(22) Filed: Aug. 20, 2010

(65) Prior Publication Data
US 2012/0044784 A1 Feb. 23, 2012

(51) Int. Cl.
G01V 1/28 (2006.01)

(52) U.S. Cl.
CPC .......................................... G01V 1/28 (2013.01)
USPC .............................................................. 367/38

(58) Field of Classification Search
USPC .............................................................. 367/38
See application file for complete search history.

(56) References Cited

U.S. PATENT DOCUMENTS

| | | | | |
|---|---|---|---|---|
| 6,131,071 | A * | 10/2000 | Partyka et al. | 702/16 |
| 6,480,790 | B1 * | 11/2002 | Calvert et al. | 702/14 |
| 6,721,661 | B2 * | 4/2004 | Anstey et al. | 702/8 |
| 6,965,830 | B1 * | 11/2005 | Bahorich | 702/14 |
| 6,985,838 | B1 * | 1/2006 | Jarchow | 703/5 |
| 8,073,624 | B2 * | 12/2011 | Pierle | 702/14 |
| 2004/0199330 | A1 * | 10/2004 | Routh et al. | 702/14 |
| 2009/0192718 | A1 * | 7/2009 | Zhang et al. | 702/14 |
| 2009/0292475 | A1 * | 11/2009 | Alam et al. | 702/14 |
| 2010/0235102 | A1 * | 9/2010 | Pierle | 702/14 |

OTHER PUBLICATIONS

Gholamy, "Automatic detection of wavelets interfering in seismic sections using fractal methods", Institute of Geophysics, University of Tehran, I.R. Iran and Institute for Advanced Studies in Basic Sciences, Zanjan, I.R. Iran, 2006, downloaded from Internet at http://www.geophysics.ut.ac.ir/En/Professor/Data/Pub/Javaherian/Paper/FullPaper/ja052393_4-gholamy.pdf.
Gochioco, "Tuning effect and interference reflections from thin beds and coal seams", Geophysics, vol. 56, No. 8, Aug. 1991, pp. 1288-1295.
Kallweit, "The limits of resolution of zero-phase wavelets", Geophysics, vol. 47, No. 7, Jul. 1982, pp. 1035-1046.
Okaya, "Spectral properties of the earth's contribution to seismic resolution", Geophysics, vol. 60, No. 1, Jan.-Feb. 1995, pp. 241-251.

(Continued)

Primary Examiner — Isam Alsomiri
Assistant Examiner — James Hulka
(74) Attorney, Agent, or Firm — Colin Wier; Rodney Warfford

(57) ABSTRACT

Determining geological layer location in a subterranean formation, including receiving seismic data representing an interaction of the geological layer with propagation of a seismic wave, identifying a source wavelet representing a portion of the seismic wave impinging on a boundary of the geological layer, providing a geological layer template of the geological layer including primary and secondary reflection interfaces associated with reflectivity based on material properties of the geological layer, generating a wavelet response template by applying the source wavelet to the geological layer template using a mathematical convolution operation to model seismic wave interference caused by the primary and secondary reflection interfaces, identifying an extremum of the seismic data, and determining, based on the extremum, the location of the geological layer in the subterranean formation using the wavelet response template.

18 Claims, 14 Drawing Sheets

OTHER PUBLICATIONS

Partyka, "Interpretational applications of spectral decomposition in reservoir characterization", The Leading Edge, Mar. 1999, pp. 353-360.

Chopra, "Resolving thin beds and geological features by spectral inversion", Search and Discovery Article #40326, 2008.

Chopra, "Thin-bed reflectivity inversion", downloaded from Internet at http://www.arcis.com/docs/Thinbed_news.pdf.

Widess, "How thin is a thin bed?", Geophysics, vol. 38, No. 6, Dec. 1973, pp. 1176-1180.

* cited by examiner

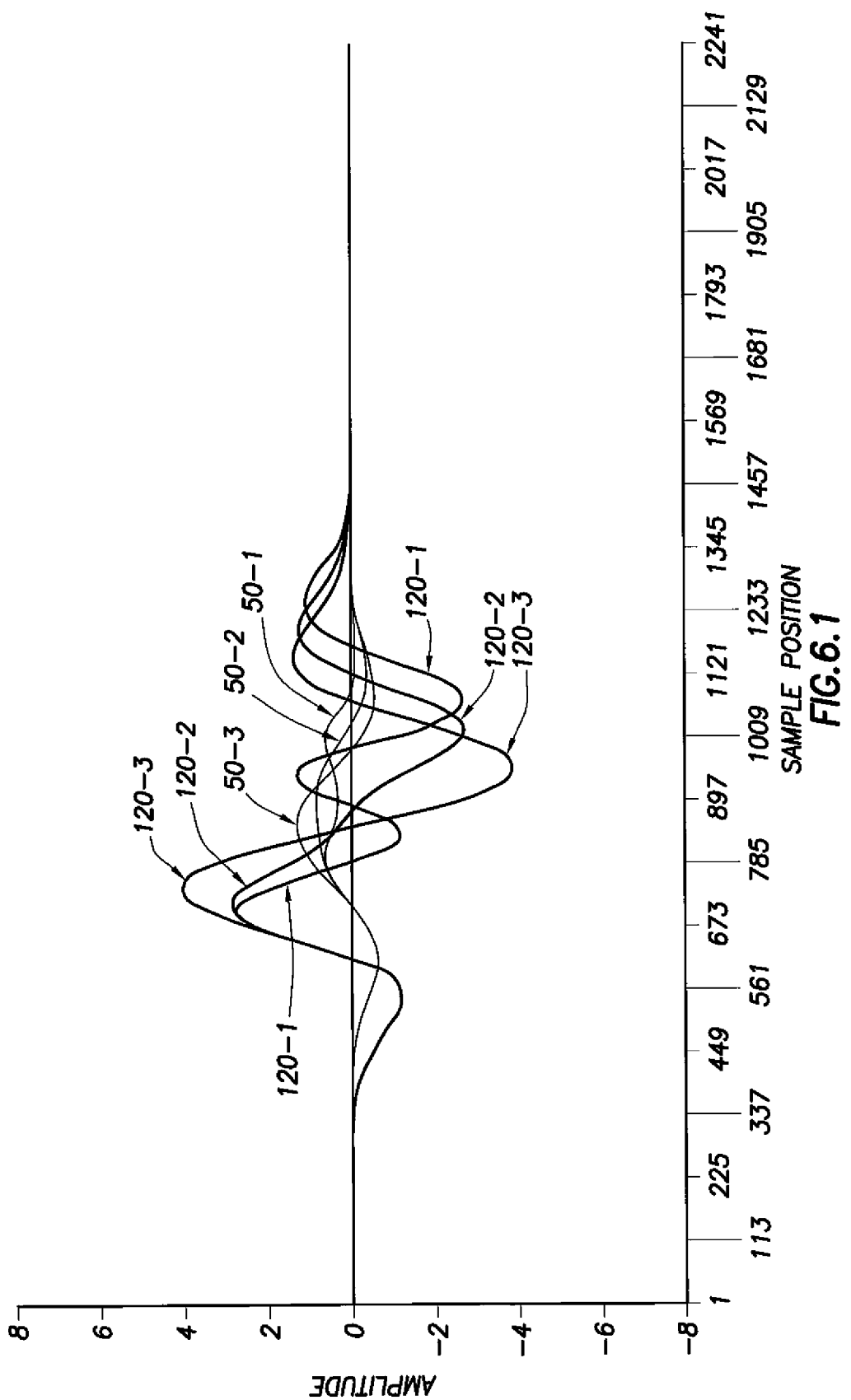
FIG.6.1

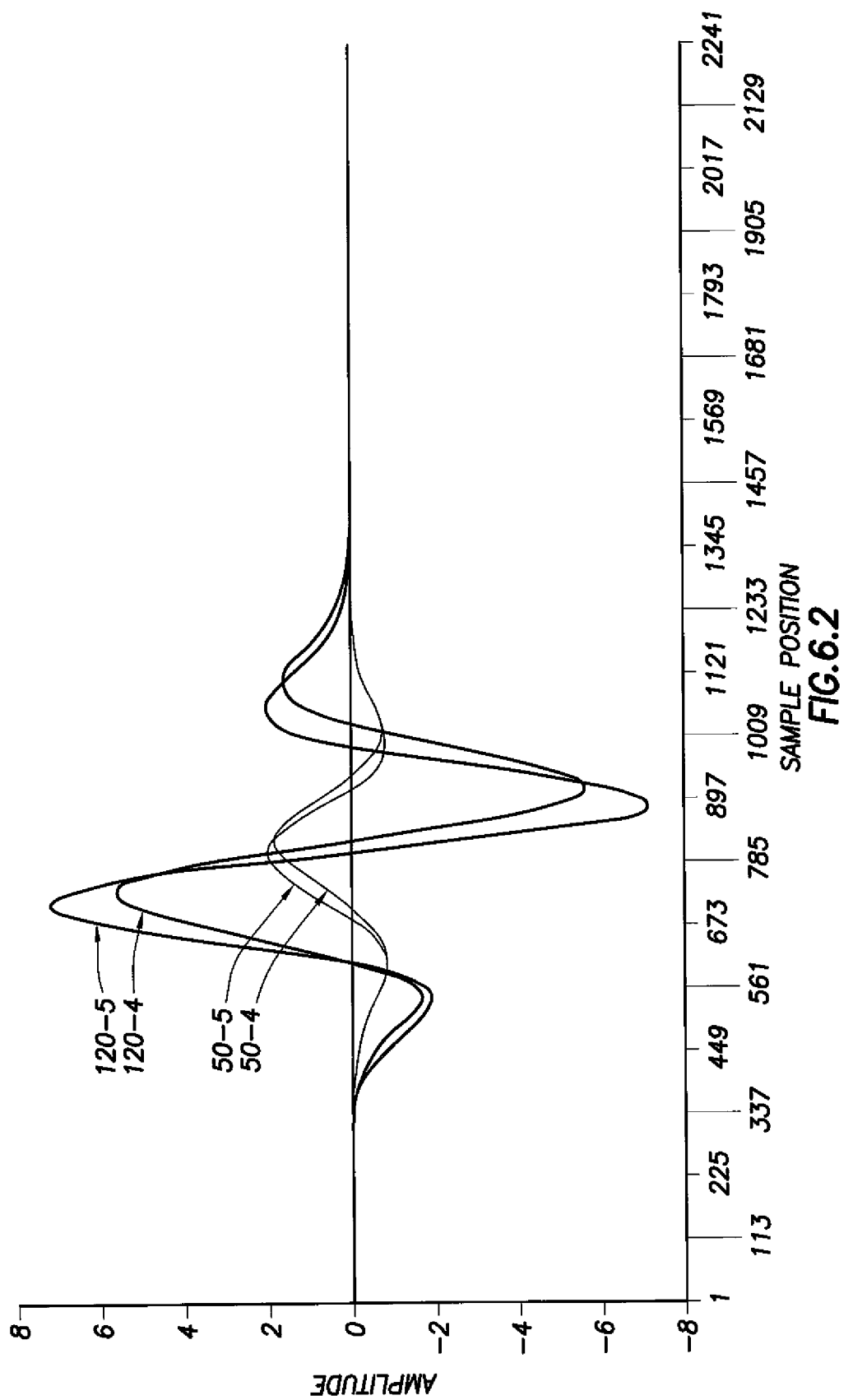
FIG.6.2

… … …

DETERMINING A POSITION OF A GEOLOGICAL LAYER RELATIVE TO A WAVELET RESPONSE IN SEISMIC DATA

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids. Although the subterranean assets are not limited to hydrocarbon such as oil, throughout this document, the terms "oilfield" and "oilfield operation" may be used interchangeably with the terms "field" and "field operation" to refer to a field having any types of valuable fluids or minerals and field operations relating to any of such subterranean assets.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

In particular, seismic survey typically is employed for purposes of discovering hydrocarbon (oil and gas) deposits in geological formations. In the seismic survey, sources generate seismic waves, or signals, which propagate into the geological formations and create pressure changes and vibrations along their way. Changes in elastic properties of the geological formations scatter the seismic waves, changing the waves' directions of propagation and other properties. Part of the energy that is emitted by the sources reaches seismic sensors. Some seismic sensors are sensitive to pressure changes (hydrophones), others to particle motion (e.g., geophones), and industrial surveys may deploy only one type of sensors or both. In response to the detected seismic events, the seismic sensors generate electrical signals to produce seismic data. Analysis of the seismic data can then indicate the presence or absence of probable locations of hydrocarbon deposits.

Traditional seismic data processing is based on the premise that the seismic measurements are insufficient for purposes of resolving the thickness of a bedding layer, which is less than one quarter of the wavelength of the seismic signal. However, a hydrocarbon deposit may be contained in a relatively thin bedding layer that has a thickness that is less than the one quarter wavelength threshold. Examples of such thin bedding layers include sediment layers that are formed by streams, rivers, bay deposits, turbidic flows and the fragmented remains of talus slopes that are generated by wave action against reefs. Therefore, the one quarter wavelength limitation precludes the discrimination of relatively thin geological features and, in general, may prevent the discovery of certain oil and gas deposits.

SUMMARY

In one or more implementations of determining a position of a geological layer relative to a wavelet response in seismic data, the method includes receiving the seismic data representing an interaction of the geological layer with propagation of a seismic wave, identifying, from the seismic data, a source wavelet representing a portion of the seismic wave impinging on a boundary of the geological layer, providing a geological layer template of the geological layer including primary and secondary reflection interfaces associated with reflectivity based on material properties of the geological layer, generating a wavelet response template by applying the source wavelet to the geological layer template using a mathematical convolution operation to model seismic wave interference caused by the primary and secondary reflection interfaces, identifying an extremum of the seismic data, and determining, based on the extremum, the location of the geological layer in the subterranean formation using the wavelet response template.

Other aspects of determining a position of a geological layer relative to a wavelet response in seismic data will be apparent from the following description and the appended claims.

BRIEF DESCRIPTION OF DRAWINGS

The appended drawings illustrate several embodiments of determining a position of a geological layer relative to a wavelet response in seismic data and are not to be considered limiting of its scope, for determining a position of a geological layer relative to a wavelet response in seismic data may admit to other equally effective embodiments.

FIGS. 4-8 depict example parameters used to generate an example wavelet response template of the geological layer template for determining a position of a geological layer relative to a wavelet response in seismic data in accordance with one or more embodiments.

DETAILED DESCRIPTION

Figure 1:
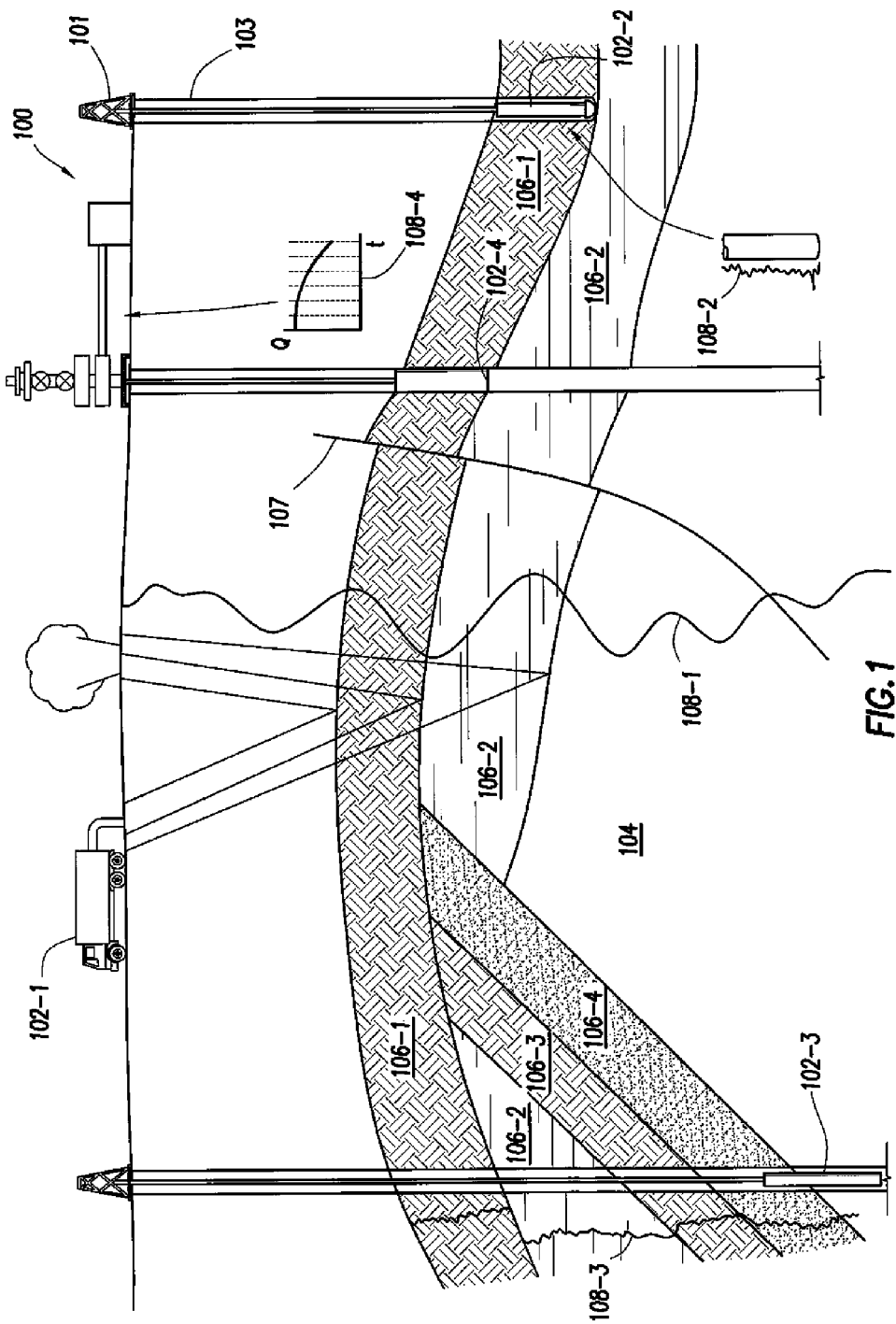
FIG. 1 depicts a schematic view, partially in cross-section, of a field having a plurality of data acquisition tools positioned at various locations along the field for collecting data from the subterranean formation, in which embodiments of determining a position of a geological layer relative to a wavelet response in seismic data may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

Seismic interpretation techniques and software tracking algorithms used therein generally select the peak, trough, or zero crossing of the seismic values in a seismic data set to determine the adequate representation of the underlining geological bedding interface, for example to track interpreted horizons on a seismic section (i.e., a two dimensional cross-section of the seismic data set). As dimensions of the bedding interfaces approach resolution limits inherent in the seismic waves (i.e., seismic resolution limitations), general seismic interpretation techniques and software tracking algorithms fail to produce satisfactory results. In general, embodiments of determining a position of a geological layer relative to a wavelet response in seismic data expand the seismic interpretation techniques and software tracking algorithms by taking seismic resolution limitations into consideration in the tracking of interpreted horizons on the seismic section. Specifically, geologic knowledge of the subsurface is inferred by determining the position of geological bedding on the seismic data near the Rayleigh's criterion, as referenced by R. S. Kallweit and L. C. Wood "The Limits of resolution of zero-phase wavelets" Geophysics, Vol. 47. No. 7 (Jul. 1982); P. 1035-1046. Accordingly, the processing and modeling steps are used to position interpreted thin-bed geologic features and to reveal in greater clarity where the refining upward and downward sequences (e.g., oil rich stratigraphic sequences such as channels, splays, talus slopes on reefs, eolian, turbidite deposits, etc.) are positioned. Throughout this document, depending on the context, the term "seismic data" may refer to raw data, processed data, and/or data outputs generated from various data.

FIG. 1 depicts a schematic view, partially in cross section of a field (100) having data acquisition tools (102-1), (102-2), (102-3), and (102-4) positioned at various locations in the field (100) for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig (101) and advanced into the subterranean formations (104) to form a wellbore (103). The drilling tools (106) may be adapted for measuring downhole properties using logging-while-drilling ("LWD") tools.

A surface unit (not shown) is used to communicate with the drilling tools (102-2) and/or offsite operations. The surface unit is capable of communicating with the drilling tools (102-2) to send commands to the drilling tools (102-2), and to receive data therefrom. The surface unit may be provided with computer facilities for receiving, storing, processing, and/or analyzing data from the field (100). The surface unit collects data generated during the drilling operation and produces data output which may be stored or transmitted. Computer facilities, such as those of the surface unit, may be positioned at various locations about the field (100) and/or at remote locations.

Sensors, such as gauges, may be positioned about the field (100) to collect data relating to various field operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the field operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting field operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical, or other simulations. The data outputs from the field operation may be generated directly from the sensors, or after some preprocessing or modeling. These data outputs may act as inputs for further analysis.

As shown in FIG. 1, data plots (108-1 through 108-4) are examples of plots of static and/or dynamic properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, historical data, user inputs, economic information, other measurement data, and other parameters of interest.

While a specific subterranean formation (104) with specific geological structures is depicted, it will be appreciated that the formation may contain a variety of geological structures. Fluid, rock, water, oil, gas, and other geomaterials may also be present in various portions of the formation. Each of the measurement devices may be used to measure properties of the formation and/or its underlying structures. While each acquisition tool is shown as being in specific locations along the formation, it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104).

Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
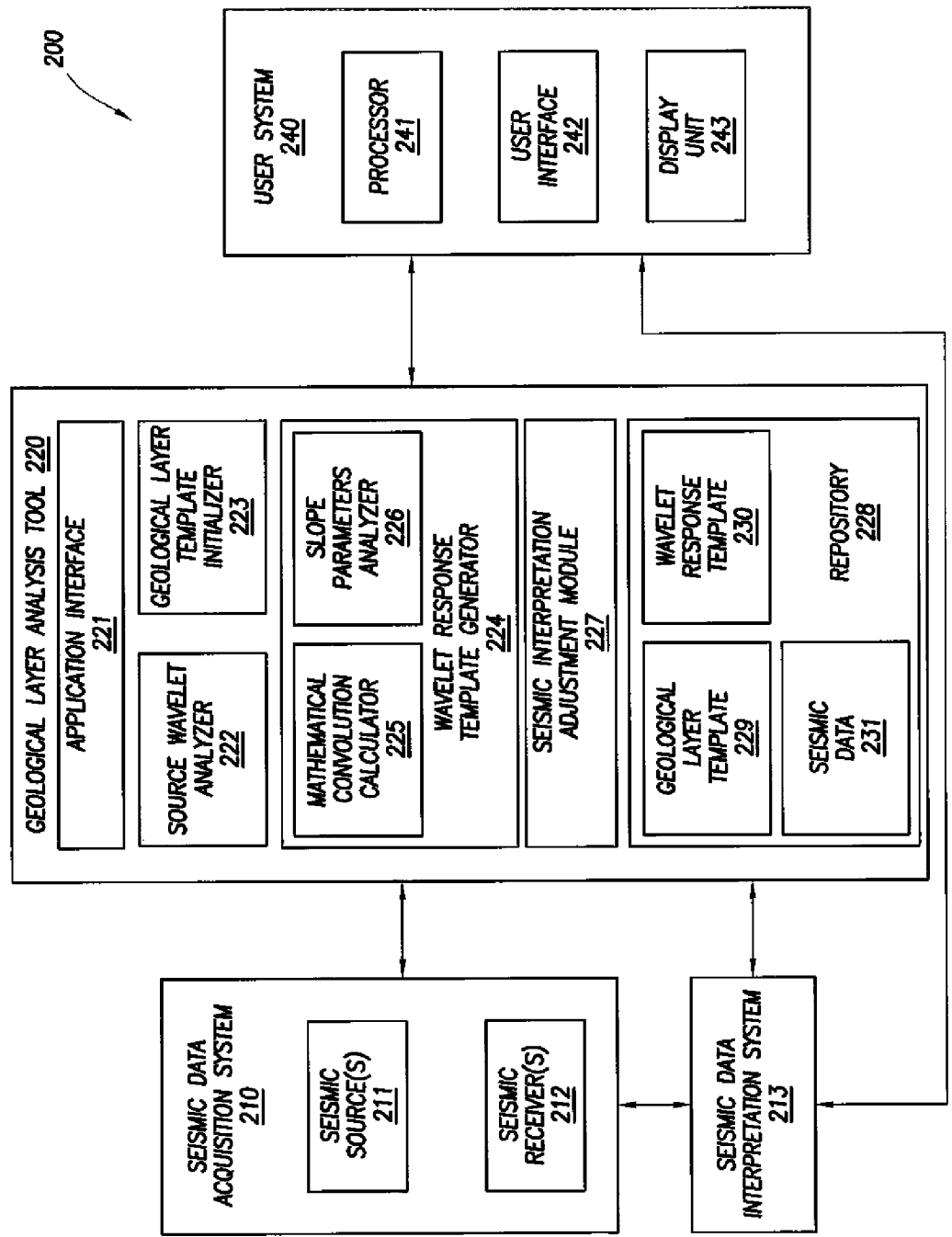
FIG. 2 depicts a system in which one or more embodiments of determining a position of a geological layer relative to a wavelet response in seismic data may be implemented.

FIG. 2 shows a diagram of a system (200) to determine a position of a geological layer relative to a wavelet response in seismic data in accordance with one or more embodiments. The system (200) includes a geological layer analysis tool (220), a user system (240), a seismic data acquisition system (210), and a seismic data interpretation system (213). The geological layer analysis tool (220) includes a repository (228), one or more application interfaces (221), a source wavelet analyzer (222), a geological layer template initializer (223), a wavelet response template generator (224), and a seismic interpretation adjustment module (227). The user system (240) includes a processor (241), a user interface (242), and a display unit (243). Each of these components is described in detail below. One of ordinary skill in the art will appreciate that embodiments are not limited to the configuration shown in FIG. 2.

In one or more embodiments, the geological layer analysis tool (220) is configured to interact with the seismic data acquisition system (210), the seismic data interpretation system (213), and the user system (240) using one or more of the application interfaces (221). The application interfaces (221) may be configured to receive data from and transmit data to the seismic data acquisition system (210), the seismic data interpretation system (213), and the user system (240), and/or store data to the repository (228).

In one or more embodiments, the seismic data acquisition system (210) may be the data acquisition tool (102-1) depicted in FIG. 1 above and includes seismic source(s) (211) and seismic receiver(s) (212). In one or more embodiments, the seismic source(s) (211) may be any seismic source known to those skilled in the art (e.g., explosive based seismic source, air gun, seismic vibrator, etc.) that is configured to generate seismic waves propagating through subterranean formation. The seismic receiver(s) (212) may be any seismic receiver known to those skilled in the art (e.g., geophone, etc.) that is configured to sense seismic wave reflections and generate seismic data representing the interaction of subterranean features (e.g., horizon, fault, or other geological layer) with propagation of the seismic wave. In one or more embodiments, the seismic data acquisition system (210) is a source of seismic data (e.g., seismic data (231)) used throughout the system (200). As noted above, seismic data in the forms of raw data, processed data, and/or data outputs generated from various data are used throughout the system (200).

In one or more embodiments, the seismic data interpretation system (213) may be any seismic data interpretation system known to those skilled in the art for processing seismic data to estimate the depth of subterranean features that generated the seismic wave reflections. The seismic data acquisition system (210), the seismic data interpretation system (213), and the user system (240) may be located in a same location or in separate locations, for example in a surface unit that may be positioned at various locations about the field (100) and/or at remote locations.

In one or more embodiments, the processor (i.e., central processing unit (CPU)) (241) of the user system (240) is configured to execute instructions to operate the components of the user system (240) (e.g., the user interface (242)).

In one or more embodiments, the user system (240) is configured to interact with a user (not shown) using the user interface (242). The user interface (242) may be configured to receive data and/or instruction(s) from the user. The user interface (242) may also be configured to deliver instruction(s) to the user. In addition, the user interface (242) may be configured to send data and/or instruction(s) to, and receive data and/or instruction(s) from, the geological layer analysis tool (220) and/or the seismic data interpretation system (213). The user may correspond to, but is not limited to, an individual, a group, an organization, or some other legal entity.

In one or more embodiments, a display unit (243) may be provided in the user system (240) for viewing data (e.g., seismic data such as seismic data (231)). The data displayed by the display unit (243) may be raw data, processed data and/or data outputs generated from various data. In one or more embodiments, the display unit (243) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (243). The display unit (243) may include a two-dimensional (2D) display or a three-dimensional (2D) display for viewing data or various aspects of the field operations.

The user system (240) may be, or may contain a form of, an internet-based communication device that is capable of communicating with the application interface (221) of the geological layer analysis tool (220). Alternatively, the geological layer analysis tool (220) may be part of the user system (240). Further, the user system (240) may be capable of communicating with the seismic data interpretation system (213). Alternatively, the seismic data interpretation system (213) may be part of the user system (240). The user system (240) may correspond to, but is not limited to, a desktop computer with internet access, a laptop computer with internet access, a smart phone, and a personal digital assistant (PDA), or other user accessible device.

As shown, communication links are provided between the geological layer analysis tool (220), the seismic data acquisition system (210), the seismic data interpretation system (213), and the user system (240). A variety of links may be provided to facilitate the flow of data through the system (200). For example, the communication links may provide for continuous, intermittent, one-way, two-way, and/or selective communication throughout the system (200). The communication links may be of any type, including but not limited to wired and wireless.

In one or more embodiments, the geological layer analysis tool (220) includes a source wavelet analyzer (222) configured to identify, from the seismic data (231), a source wavelet representing the seismic wave impinging on a boundary of the geological layer. More details of the source wavelet and the source wavelet analyzer (222) are described in reference to FIGS. 3-12 below.

In one or more embodiments, the geological layer analysis tool (220) includes a geological layer template initializer (223) configured to initialize reflectivity in a geological layer template (e.g., geological layer template (229)) based on material properties associated with the geological layer. In one or more embodiments, the geological layer template (229) includes primary and secondary reflection interfaces. More details of the geological layer template (229) and the geological layer template initializer (223) are described in reference to FIGS. 3-12 below.

In one or more embodiments, the geological layer analysis tool (220) includes a wavelet response template generator (224) configured to generate a wavelet response template (e.g., wavelet response template (230)). In one or more embodiments, the wavelet response template generator (224) includes (1) a mathematical convolution calculator (225) configured to generate a collection of modeled composite wavelets by applying the source wavelet to the geological layer template (229) to model seismic wave interference caused by the primary and secondary reflection interfaces and (2) a slope parameter analyzer (226). The slope parameter analyzer may be configured to (1) identify modeled peaks in the collection of modeled composite wavelets, (2) determine modeled slope parameters associated with the modeled peaks, (3) determine offsets from the modeled peaks to the primary and/or secondary reflection interfaces of the geological layer template (229), and (4) include the offsets indexed by the modeled slope parameters in the wavelet response template (230). More details of the wavelet response template generator (224), mathematical convolution calculator (225), slope parameter analyzer (226), wavelet response template (230), modeled composite wavelets, modeled peaks, modeled slope parameters, and offsets are described in reference to FIGS. 3-12 below.

In one or more embodiments, the seismic data interpretation system (213) is configured to identify, based on user input, a peak of the seismic data associated with the geological layer. In one or more embodiments, the geological layer analysis tool (220) includes a seismic interpretation adjustment module (227) configured to communicate with the seismic data interpretation system (213) and performs adjustments to the results (e.g., seismic interpretations) thereof. For example, the seismic interpretation adjustment module (227) may obtain the identified peak (or interpreted peak) of the seismic data associated with the geological layer from the seismic data interpretation system (213) and generate adjustments to the interpreted boundaries and thickness of the geological layer, in particular when the thickness of the geological layer is near or less than a quarter of a wavelength of the source wavelet.

In one or more embodiments, the seismic interpretation adjustment module (227) is configured to identify a slope associated with the peak of the seismic data, identify an offset from the offsets in the wavelet response template (230) by comparing the slope to modeled slope parameters in the wavelet response template (230), and determine a location of the geological layer (in particular, the boundary thereof) in the subterranean formation based on the peak of the seismic data and the offset identified in the wavelet response template (230).

In one or more embodiments, seismic interpretation adjustment module (227) is further configured to determine a thickness of the geological layer based on the peak of the seismic data and the offset identified in the wavelet response template (230). More details of the seismic interpretation adjustment module (227) are described in reference to FIGS. 3-12 below.

In one or more embodiments, a central processing unit (CPU, not shown) of the geological layer analysis tool (220) is configured to execute instructions to operate the components of the geological layer analysis tool (220) (e.g., repository (228), the source wavelet analyzer (222), the geological layer template initializer (223), the wavelet response template generator (224), and the seismic interpretation adjustment module (227). In one or more embodiments, the memory (not shown) of the geological layer analysis tool (220) is configured to store software instructions for using the components of the geological layer analysis tool (220) to determine a position and/or thickness of a subterranean geological layer. The memory may be one of a variety of memory devices, including but not limited to random access memory (RAM), read-only memory (ROM), cache memory, and flash memory. The memory may be further configured to serve as back-up storage for information stored in the repository (228).

In one or more embodiments, the geological layer analysis tool (220) is configured to obtain and store data in the repository (228). In one or more embodiments, the repository (228) is a persistent storage device (or set of devices) and is configured to receive data from and/or deliver data to the seismic data acquisition system (210), the seismic data interpretation system (213), and/or from the user system (240) using the application interface (221). The repository (228) may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data (e.g., seismic data) for a field (100). The repository (228) may be a device internal to the geological layer analysis tool (220). Alternatively, the repository (228) may be an external storage device operatively connected to the geological layer analysis tool (220).

In one or more embodiments, the geological layer analysis tool (220) is configured to interact with the user system (240) using the application interface (221). The application interface (221) may be configured to receive data and/or instruction(s) from the user system (240). The application interface (221) may also be configured to deliver instruction(s) to the user system (240). In addition, the application interface (221) may be configured to send data and/or instruction(s) to, and receive data and/or instruction(s) from, the repository (228), the seismic data acquisition system (210), and/or the seismic data interpretation system (213).

In one or more embodiments, the data transferred between the application interface (221), the repository (228), the seismic data acquisition system (210), and/or the seismic data interpretation system (213) corresponds to field data, such as seismic data and/or various templates/models of the field (100). In one or more embodiments, the geological layer analysis tool (220) is configured to support various data formats provided by the seismic data acquisition system (210), the seismic data interpretation system (213), and/or the user system (240).

The geological layer analysis tool (220) may include one or more system computers, which may be implemented as a server or any conventional computing system. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network personal computers, mini-computers, mainframe computers, and the like.

While specific components are depicted and/or described for use in the units and/or modules of the geological layer analysis tool (220), it will be appreciated that a variety of components with various functions may be used to provide the formatting, processing, utility and coordination functions necessary to modify the geological layer template (229) and the wavelet response template (230) in the geological layer analysis tool (220). The components may have combined functionalities and may be implemented as software, hardware, firmware, or combinations thereof.

Figure 3:
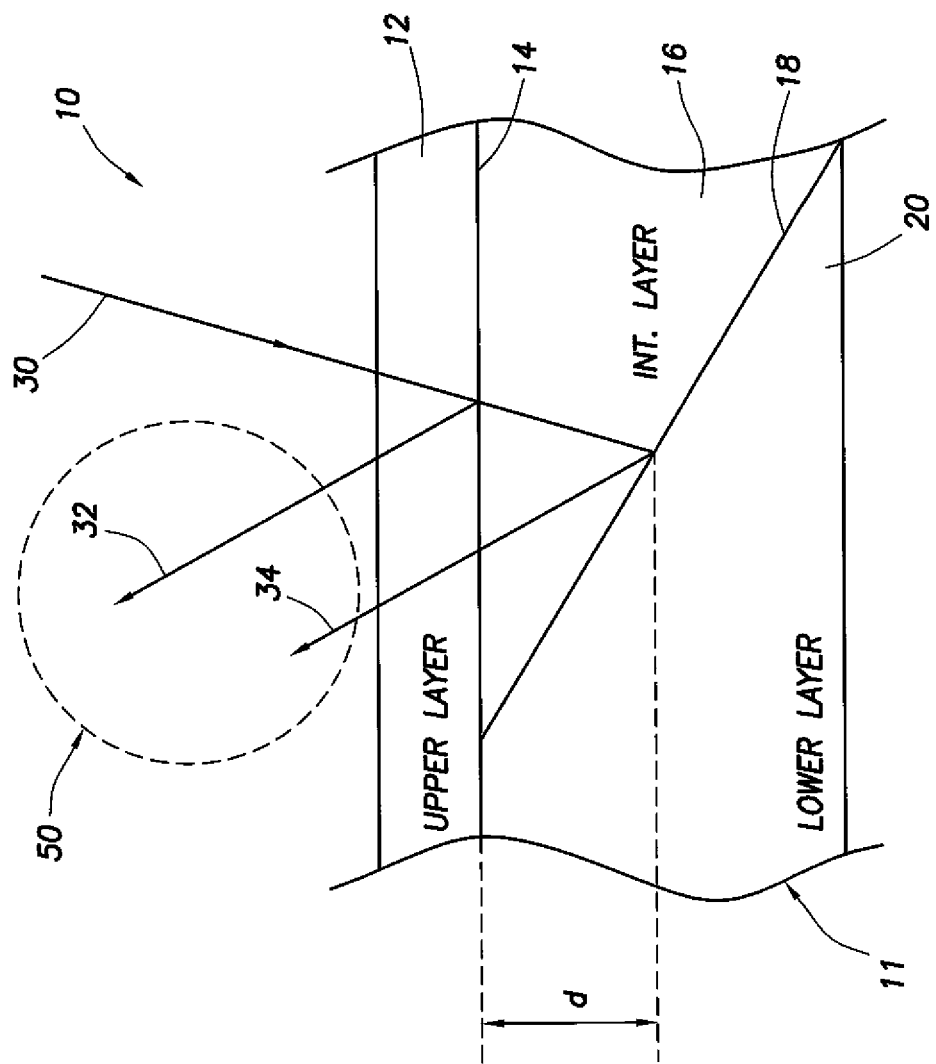
FIG. 3 depicts an example geological layer template for determining a position of a geological layer relative to a wavelet response in seismic data in accordance with one or more embodiments.

FIG. 3 depicts an example geological layer template for determining a position of a geological layer relative to a wavelet response in seismic data in accordance with one or more embodiments. In general, the example geological layer template may be used to represent the sandstone layer (106-1), limestone layer (106-2), shale layer (106-3), and sand layer (106-4) depicted in FIG. 1 above. In accordance with determining a position of a geological layer relative to a wavelet response in seismic data, the geological layer template may be used to calculate and record seismic signal slope parameters pertinent to determining position of a geological layer, in particular when the layer thickness is near or less than one quarter of the seismic signal's wavelength. To illustrate this approach, FIG. 3 sets forth a geological layer template (10) that illustrates the interaction between an incident seismic wave represented as a source wavelet (30) and an example geological structure (11). In one or more embodiments, the geological structure (11) is associated with material properties (e.g., reflection coefficients, reflectivity, acoustic impedance, etc.) of the geological layer of interest but assumes a pre-determined geometry independent of the actual forms of the geological layer of interest. Said in other words, the geological structure (11) is a generic schematic representation of the geological layer of interest.

As shown in FIG. 3, the interaction between the source wavelet (30) and the schematic representation of the geological layer of interest produces a primary reflected signal (32) and a secondary reflected signal (34). Throughout this document, the terms "wave", "seismic wave", "signal" and "seismic signal" may be used interchangeably depending on the context. At a relatively large layer thicknesses, the primary reflected signal (32) and a secondary reflected signal (34) are received by seismic receivers (or sensors, not shown) as a composite of signal wave forms (50) of the two reflected signals (32) and (34) separated by a time interval dependent on the particular layer thickness where the reflections occur and the seismic wave propagation velocity. However, the primary reflected signal (32) and secondary reflected signal (34) constructively or destructively interfere with each other for relatively small layer thicknesses and, in general, measurements by seismic receivers (i.e., signal (50)) need to be processed with a more detailed model to gain an understanding of the geological structure (11). Accordingly, characteristics of the signal (50) vary depending on the reflection point where the primary and secondary reflected signals are produced. As is known to those skilled in the art, the terms "relatively large" and "relatively small" refer to a relative scale based on the wavelength of the incident seismic signal.

For the geological layer template (10) that is depicted in FIG. 3, the geological structure (11) contains three example layers: an upper layer (12), a wedge-shaped intermediate layer (16) and a complementary wedge-shaped lower layer (20). Consistent with the descriptions above and as depicted in FIG. 1 above, the wedge-shaped intermediate layer (16) may represent a portion of the sandstone layer (106-1), limestone layer (106-2), shale layer (106-3), and sand layer (106-4) where two boundaries of a layer intersect. The goal is to calculate and record seismic signal slope (i.e., time derivative) parameters when a thickness (referred to as "d" in FIG. 3) of the intermediate layer (16) is near or less than a quarter wavelength of the source wavelet (30). More specifically, as depicted in FIG. 3, a boundary (14) exists between the upper layer (12) and intermediate layer (16), and a boundary (18) exists between the intermediate layer (16) and the lower layer (20). Due to reflectivity differences, the boundaries (14) and (18) create respective reflection interfaces that influence the primary signal (32) and secondary signal (34) and, thus, influence the composite signal that is formed from the signals (32) and (34) and is sensed by seismic sensors.

More specifically, as depicted in FIG. 3, the source wavelet (30) reflects at the reflection interface that corresponds to the boundary (14) to produce the corresponding primary reflected signal (32), and the source wavelet (30) reflects at the reflection interface that corresponds to the boundary (18) to produce the corresponding secondary reflected signal (34). The boundaries (14) and (18) are separated by the thickness d of the intermediate layer (16), which decreases from right to left across the structure (11) in FIG. 3 due to the inclination of the layer (16). For the following discussion, it is assumed that the upper layer (12) has generally low impedance, and the intermediate layer (16) has a positive reflectivity and relatively high impedance. The lower layer (20) is assumed to have either a negative reflectivity with relatively low impedance or a positive reflectivity with relatively high impedance for various different scenarios. Although the example geological layer template (10) is associated with a particular wedge shaped geometry, other suitable geometries (e.g., a pointed shape with non-linear boundaries) may also be used. Further, although particular example material properties are used here for illustration purposes, in general the material properties associated with the geological layer template (10) are determined based on the geological layer of interest.

The constructive interference between the primary reflected signal (32) and secondary reflected signal (34) progressively increases as the thickness (d) decreases such that eventually, when there is no separation, the signals (32) and (34) merge. Conventionally, it has been assumed that the composite reflected seismic signal that is sensed by the seismic sensors cannot be used to resolve the position of the geological layer when a corresponding thickness is less than approximately one quarter wavelength of the incident seismic wave (hereinafter referred to as the "one quarter wavelength threshold"). However, as described herein and using the geological layer template (10), slope parameters extracted from the seismic data, which are imparted by the interaction of the incident seismic wave (corresponding to source wavelet (30) in the template) and the reflection interfaces (schematically corresponding to the wedge shaped intermediate layer (16)) of the geological layer of interest, may be observed and used to resolve a layer position and thickness below the one quarter wavelength threshold.

As noted above, the source wavelet (30) represents the seismic wave impinging upon the geological structure (11), which is typically subsequent to propagating through the subterranean formation from a seismic source. Given a known seismic source model (i.e., description of pressure change over time), the source wavelet (30) is a result of spectral dispersion due to the filtering effect of the subterranean formation. Generally speaking, source wavelet (30) from a seismic source using an explosion mechanism exhibits a waveform similar to the Ricker wavelet model. Accordingly, the seismic traces and data points exhibit characteristics of the Ricker wavelet. In other examples where the seismic source is based on other mechanisms (e.g., air gun, seismic vibrator, etc.), the source wavelet (30) may be different than the Ricker wavelet (e.g., a Klauder wavelet) and the seismic traces and data points exhibit characteristics other than that of the Ricker wavelet.

For the purposes of setting forth a non-limiting example of how the slope parameters may be used to resolve small layer positions and thicknesses, the source wavelet (30) is assumed below to be a twenty Hertz (Hz) Ricker wavelet, which may be described by the following equation:

$$f(t) = (1 - 2\pi^2 v_M^2 t^2) e^{-\pi^2 v_M^2 t^2},$$

where "$v_M$" represents the dominant frequency, and "t" represents time. The two reflected signals (32) and (34) generally follow the waveform of the source wavelet (30) and are, thus, also Ricker wavelets of possible different proportion and, as described below, the signal (32) (i.e., primary wavelet) and signal (34) (i.e., secondary wavelet) combine to form a signal referred to as composite wavelet (50) that retains the two individual waveforms of the Ricker wavelets when they are separated from each other at relatively large layer thickness. The composite wavelet (50), as a combination of the primary and secondary wavelets, is sensed by one or more seismic sensors (not shown) to form seismic measurements (e.g., seismic traces). Throughout this disclosure, the term "wavelet" may refer to primary wavelet, secondary wavelet, composite wavelet, or a portion thereof depending on the context.

As can be seen in FIG. 3, the boundaries (14) and (18) are inclined with respect to each other and thus are separated by a progressively smaller thickness d and smaller associated separation time (i.e., separation in arrival time of seismic signals) moving from right to left across the illustrated structure (11).

In general, a particular slope may be calculated using data points that are extracted from the seismic trace. The slope may then be compared to the corresponding slope of the source wavelet (30) for purposes of calculating the slope parameters. As noted above, the source wavelet (30) from a seismic source using explosion mechanism exhibits a waveform of Ricker wavelet. Accordingly, the particular slope parameter may be calculated based on characteristics of the Ricker wavelet. In other examples where the seismic source is based on other mechanisms (e.g., air gun, ground stamping, etc.), the source wavelet (30) may be different than the Ricker wavelet and the particular slope parameter may be calculated based on characteristics other than that of the Ricker wavelet.

Figure 4:
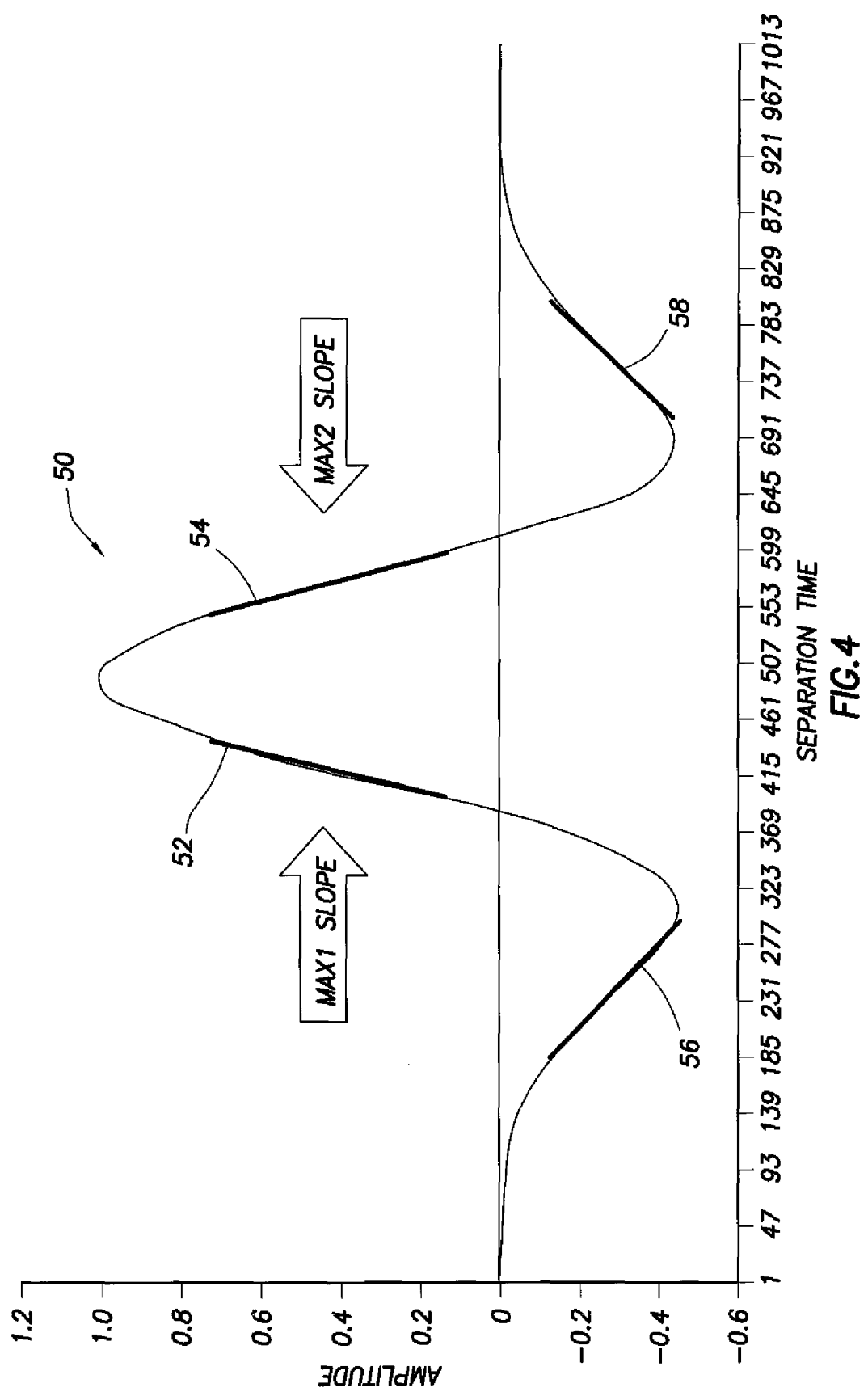

A portion of the composite wavelet (50) that is measured by the seismic sensors is generally depicted in FIG. 4. In particular, the portion of the composite wavelet (50) depicted in FIG. 4 represents one of the aforementioned two individual waveforms of the Ricker wavelets. As shown, the portion of the composite wavelet (50) has two slopes (i.e., time derivatives of the wavelet) that are located on the main lobe of the composite wavelet (50): a positive going slope (52) and a negative going slope (54), labeled as "MAX1 Slope" and "MAX2 Slope", respectively. The composite wavelet (50) also has two slopes associated with the side lobes of the composite wavelet (50): a negative going slope (56) and a positive going slope (58). In one or more embodiments, a slope is identified at an inflection point of the source wavelet (30) and/or the composite wavelet (50) where the greatest rate of change in amplitude over a corresponding interval of time occurs. In other embodiments, the slope may be identified using other pre-determined criteria on the source wavelet (30) and/or the composite wavelet (50).

In particular, techniques are described herein which observe and analyze parameters of the slopes (52) and (54) of the composite wavelet (50). However, it is understood that the slopes (56) and (58) of the side lobes may also be observed in addition or in lieu of the slopes (52) and (54) for purposes of determining layer position and/or thicknesses, in accordance with other embodiments of the invention. These parameters are referred to as slope parameters and include a magnitude of the slope, a change of magnitude of the slope compared to the source wavelet, a position (horizontal position, vertical position, or combination thereof) of the slope on the wavelet, a change of position of the slope compared to the source wavelet, or any other parameter representing certain characteristics of the slope. Thus, many variations are contemplated and are within the scope of the appended claims.

Figure 5:
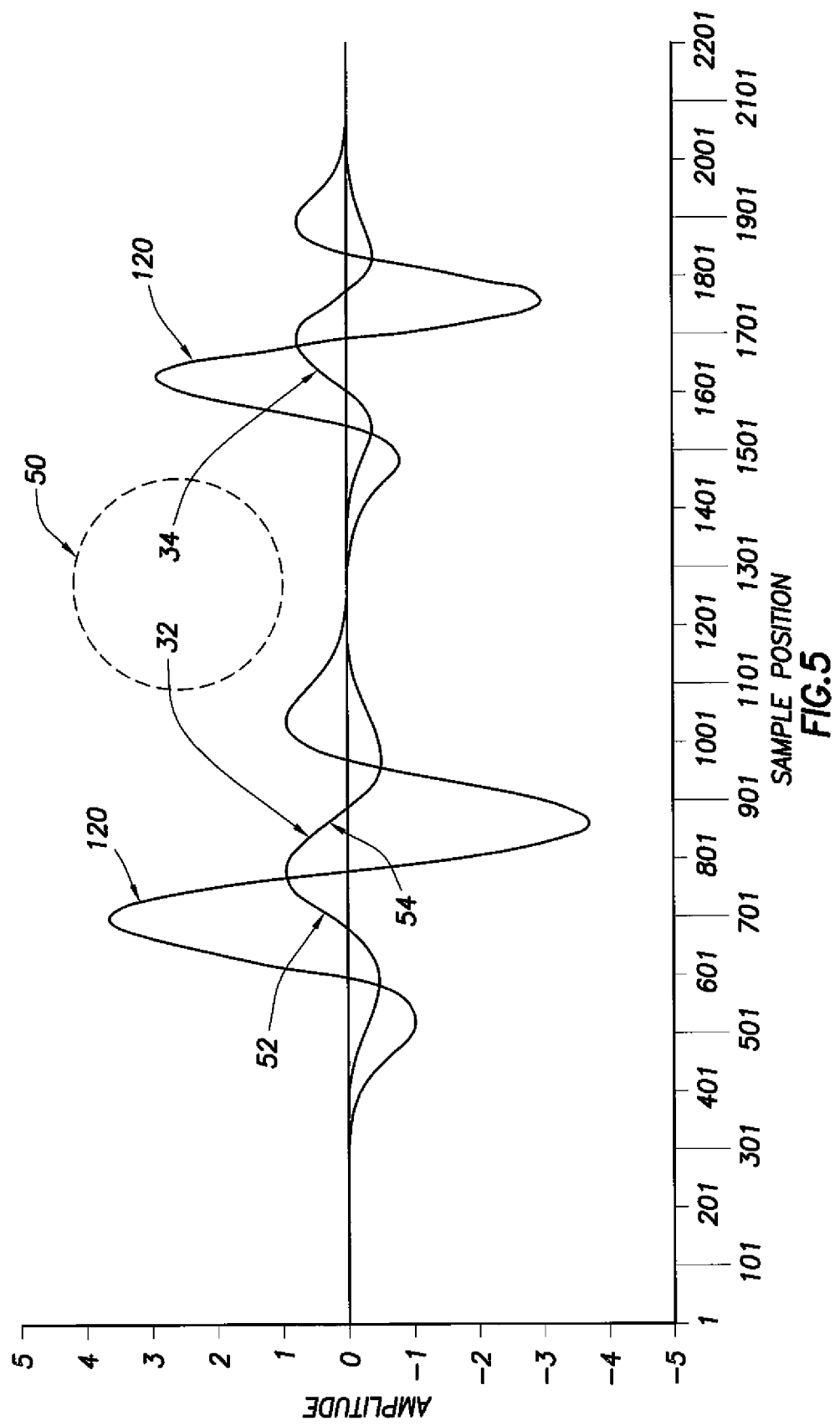

As described herein, parameters (as compared to the source wavelet (30)) in one or more of the slopes of the composite wavelet (50) may be analyzed for purposes of resolving geological bedding layer position and/or thicknesses below the one quarter wavelength threshold. For purposes of illustrating the slopes (52) and (54) of the composite wavelet (50), the time derivative (120) of the composite wavelet (50) is depicted in FIG. 5. It is noted that the horizontal axes in FIGS. 5-6.2 use sample positions in seismic data to represent the time scale. As is known to those skilled in the art, seismic data is typically collected and represented using an appropriate sampling interval while time information (e.g., two-way travel time) is typically represented on a relative scale based on an appropriate reference time point. Further, as known to those skilled in the art, a seismic wavelet and associated slope are typically represented in a normalized format. Said in other words, the amplitude scale of the seismic wavelet and associated slope are typically adjusted for considerations such as noise, propagation loss, seismic source strength, etc. As noted above, the composite wavelet (50) includes signal (32) (i.e., primary wavelet) and signal (34) (i.e., secondary wavelet), where each signal retains the respective waveform of a Ricker wavelet when the layer thickness at the reflection point is relatively large compared to the quarter wavelength limit. The polarities of the two Ricker wavelets may be the same as or opposite to each other due to positive and/or negative polarities of the respective surface reflectivity.

When the primary and secondary wavelets begin to constructively or destructively interfere with each other, significant changes begin to appear in the slopes (52) and (54). The first changes occur with the portion of the time derivative (120) that corresponds to the negative going slope (54) and then these changes are followed by changes to the portion of the time derivative (120) that corresponds to the positive going slope (52). The changes continue to occur as the distance (d) decreases to and then surpasses the one quarter wavelength threshold. Thus, as illustrated below by way of example, the one quarter wavelength threshold does not establish the smallest thickness where position and/or thickness may be resolved.

FIG. 6.1 illustrates three example composite wavelets (50-1), (50-2), (50-3) and their corresponding derivatives (120-1), (120-2), (120-3) as constructive interference becomes increasingly pronounced at example separation times of 20 ms, 16 ms and 12 ms, respectively, across the intermediate layer (16). In one or more embodiments, these composite wavelets are generated using mathematical convolution operation based on the source wavelet (30), material properties of the structure (11), and the geometry of the structure (11). In this regard, as depicted in FIG. 6.1, the time derivative (120) significantly changes as the separation time (and the thickness d) decreases. In particular, the time derivative (120) significantly changes not only in the magnitude of the slope but also in a relative position (e.g., vertically or horizontally) where the slope (or inflection point) occurs on the primary or secondary wavelet. FIG. 6.2 depicts two additional example composite wavelets (50-4), (50-5) and their corresponding derivatives (120-4), (120-5) when the one quarter wavelength threshold that corresponds to a separation time of 12.5 ms is essentially reached within close range. As can be seen from FIGS. 6.1 and 6.2, the most dramatic changes occur near the one quarter wavelength boundary.

Figure 7:
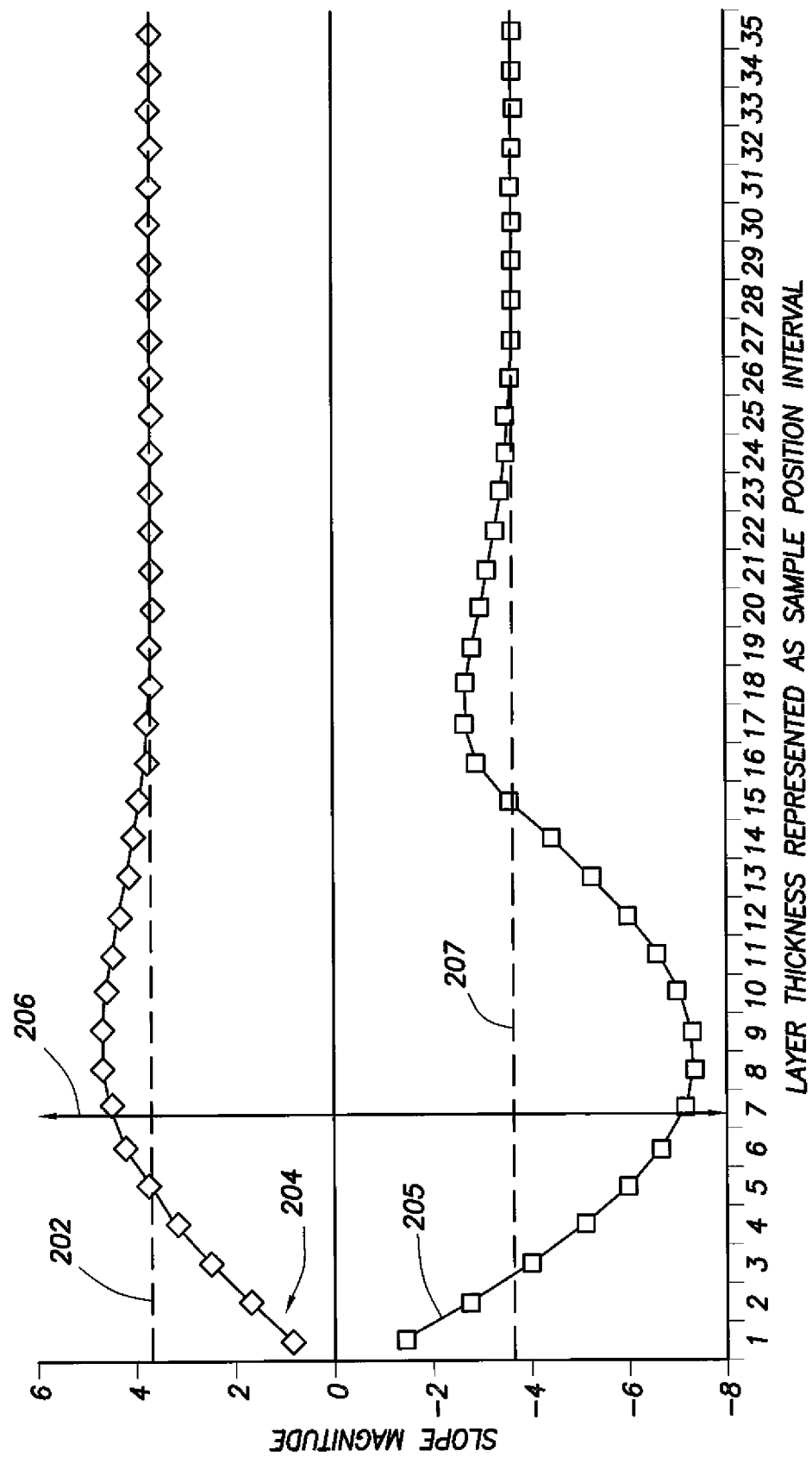

FIG. 7 is an illustration of two curves (204) and (205), which represent the magnitudes of the slopes (52) and (54) for different layer thickness along the interfaces in the structure (11). It is noted that the horizontal axes in FIGS. 7 and 8 use a sample position interval to represent layer thickness. Specifically, the sample position interval is the difference between the seismic data sample positions corresponding to the two reflection interfaces. FIG. 7 also depicts the one quarter wavelength boundary time (206). As can be seen, the positive going slope (204) changes abruptly near the boundary (206), and the negative going slope (205) also changes abruptly near the boundary (206). Both of these slopes reveal a pronounced change near the one quarter wavelength boundary (206), thereby demonstrating how the position and thickness may be determined below the one quarter wavelength boundary. As would be expected by one skilled in the art, both of these slopes reveal an asymptotic trend towards line (202) and line (203) having same magnitude but opposite polarity as the layer thickness increases away from the one quarter wavelength boundary time (206), which is consistent with FIGS. 4 and 5. Specifically, lines (202) and (203) represent the slopes positions of the primary wavelet that is not affected by the approaching secondary wavelet. These lines are reference lines to demonstrate the degree of change that the secondary wavelet has on the slopes of the primary wavelet.

Figure 8:
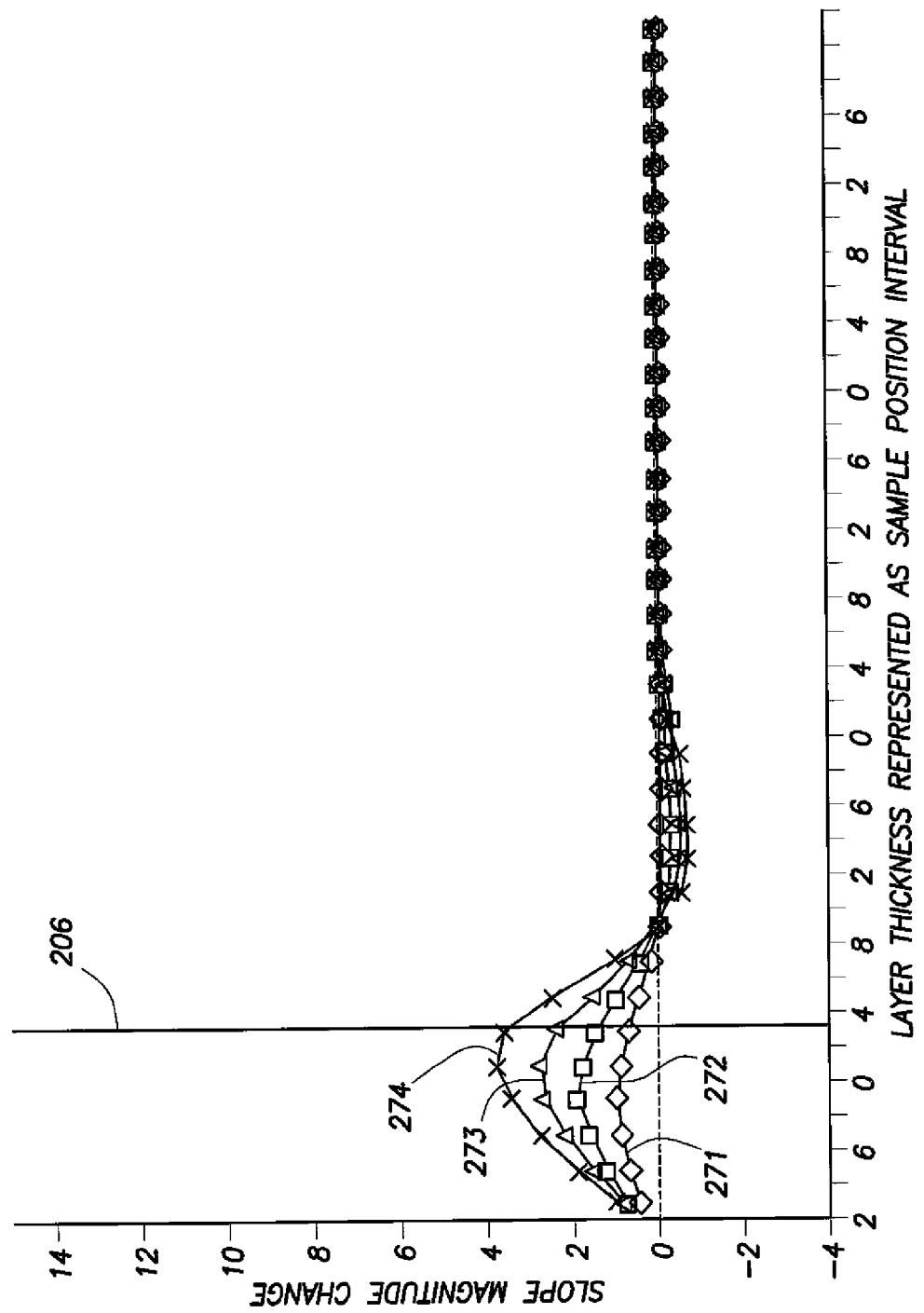

FIG. 8 illustrates the magnitudes in the positive going slope (52) and negative going slope (54), respectively for the scenario in which the lower layer (20) is a positive reflector. For example, the lower layer (20) may have increased impedance, thus behaving as a positive reflector. In this regard, for the positive going slope (52), FIG. 8 depicts graphs (271), (272), (273) and (274), for a relative reflectivity of 25%, 50%, 75% and 100%, respectively. As is known to those skilled in the art, the relative reflectivity is determined based on material properties of the geological layer of interest and is assigned to the geological layer template for determining the position of the geological layer of interest. As can be seen from FIG. 8, the changes in the time shifts become more apparent for the positive going slope (52) as the one quarter wavelength threshold (206) is exceeded. Similarly, graphs may be composed for the negative going slope (58). Pronounced changes in the negative going slope (54) can also be observed before the one quarter wavelength threshold (206) is exceeded.

In summary, FIGS. 7 and 8 illustrate slope magnitudes extracted from composite wavelets generated by applying the source wavelet to the geological layer template using a mathematical convolution operation. Such slopes and slope magnitudes are therefore referred to as modeled slopes and modeled slope magnitudes. Similar graphs may be composed for other modeled slope parameters (e.g., vertical or horizontal positions on the composite wavelet where the modeled slope occurs) extracted from composite wavelets generated by applying the source wavelet to the geological layer template using the mathematical convolution operation. Further, although FIGS. 7 and 8 are composed based on the slope at the inflection point of the composite wavelet, similar graphs may be composed based on other pre-determined criteria for identifying the modeled slopes on the composite wavelet.

As will be described below, the slope parameters of observed wavelet in seismic data may be compared to the aforementioned modeled slope parameters for purposes of determining the position and/or thickness of a given geological bedding layer below the one quarter wavelength threshold.

Figure 9:
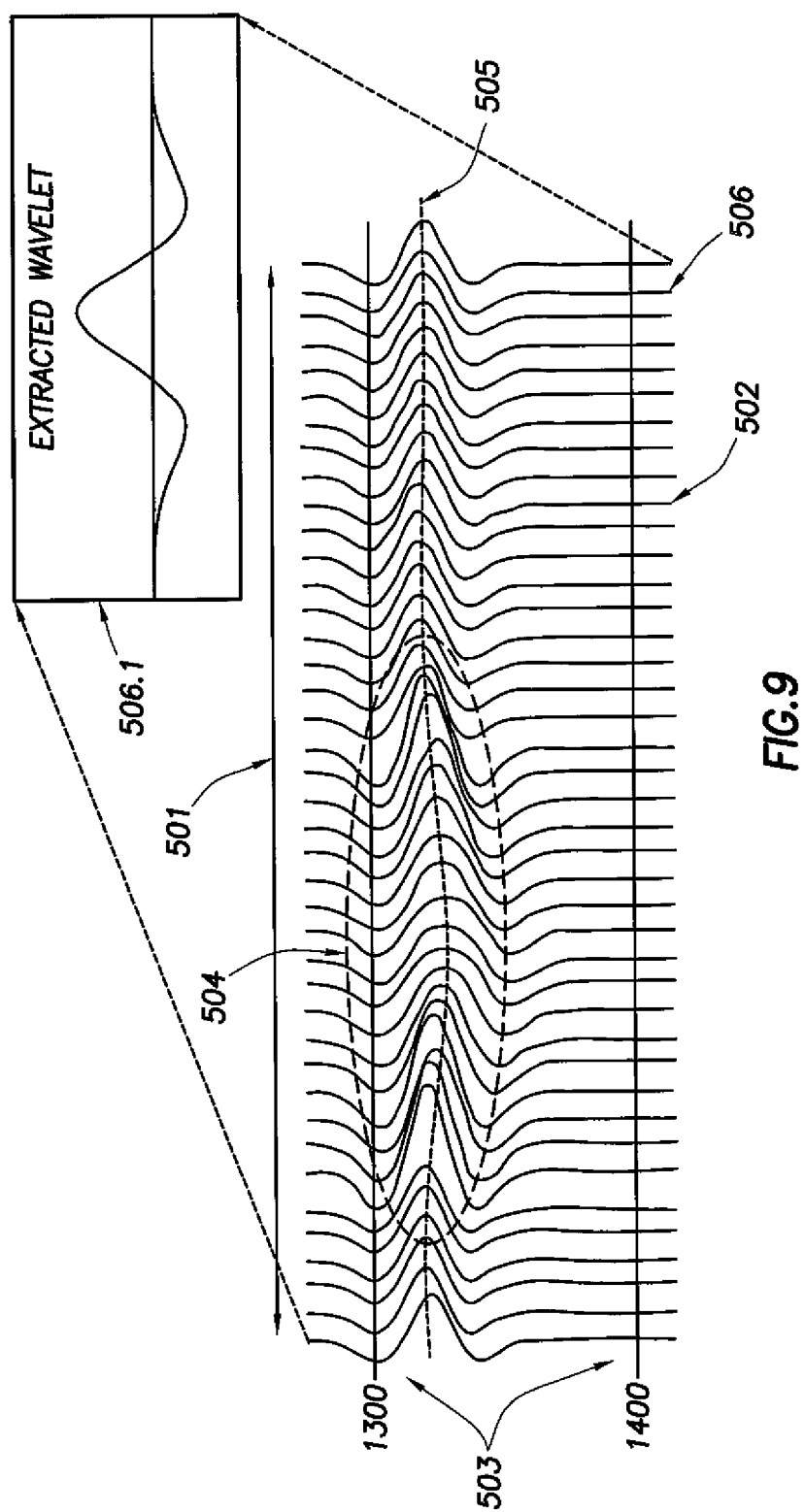
FIG. 9 depicts example seismic data from which position of geological layer relative to wavelet response is determined in accordance with one or more embodiments.

FIG. 9 depicts example seismic data for determining a position of a geological layer relative to a wavelet response in seismic data in accordance with one or more embodiments. Specifically, FIG. 9 shows a collection of wavelets (506) extracted from seismic measurements. Each of the collection of wavelets (506) is represented schematically as extracted wavelet (506.1) with general waveform depicted in FIG. 4 above. For example, wavelet (502) is essentially the same as the composite wavelet (50) corresponding to a particular reflection point in the structure (11) where the reflection point can be identified using the method described in reference to FIGS. 10-12 below for determining position and/or thickness of the underlining geological bedding (i.e., geological layer of interest) corresponding to the wavelet (502). As shown in FIG. 9, the collection of wavelets (506) are plotted along the vertical axis and positioned along the horizontal axis at pre-determined seismic data sampling positions corresponding to reflection points along subterranean reflecting surface(s) in the seismic data. The collection of wavelets (506) are shown to be within a horizontal range (501) corresponding to a geological layer of interest where a particular pattern (504) is identified as a feature in the seismic data during seismic interpretation. Specifically, interpreted peak positions of the collection of wavelets (506) approximate a straight line (505) with a perturbation within the pattern (504) indicative of the relatively small thickness of the geological layer of interest. The vertical position of the line (505) outside of the pattern (504) generally indicates a location of the geological layer of interest, for example within a depth range corresponding to a range (503) of seismic data sampling positions between 1300 ms and 1400 ms. In one or more embodiments of determining a position of a geological layer relative to a wavelet response in seismic data, the perturbation of the line (505) within the pattern (504) is processed using a method described in reference to FIGS. 10-12 below. In one or more embodiments, the source wavelet used therein is extracted from the collection of wavelets (506) outside of the particular pattern (504). For example, the wavelet (506) may be identified and processed to create the source wavelet for the method described in reference to FIGS. 10-12 below.

Figure 10:
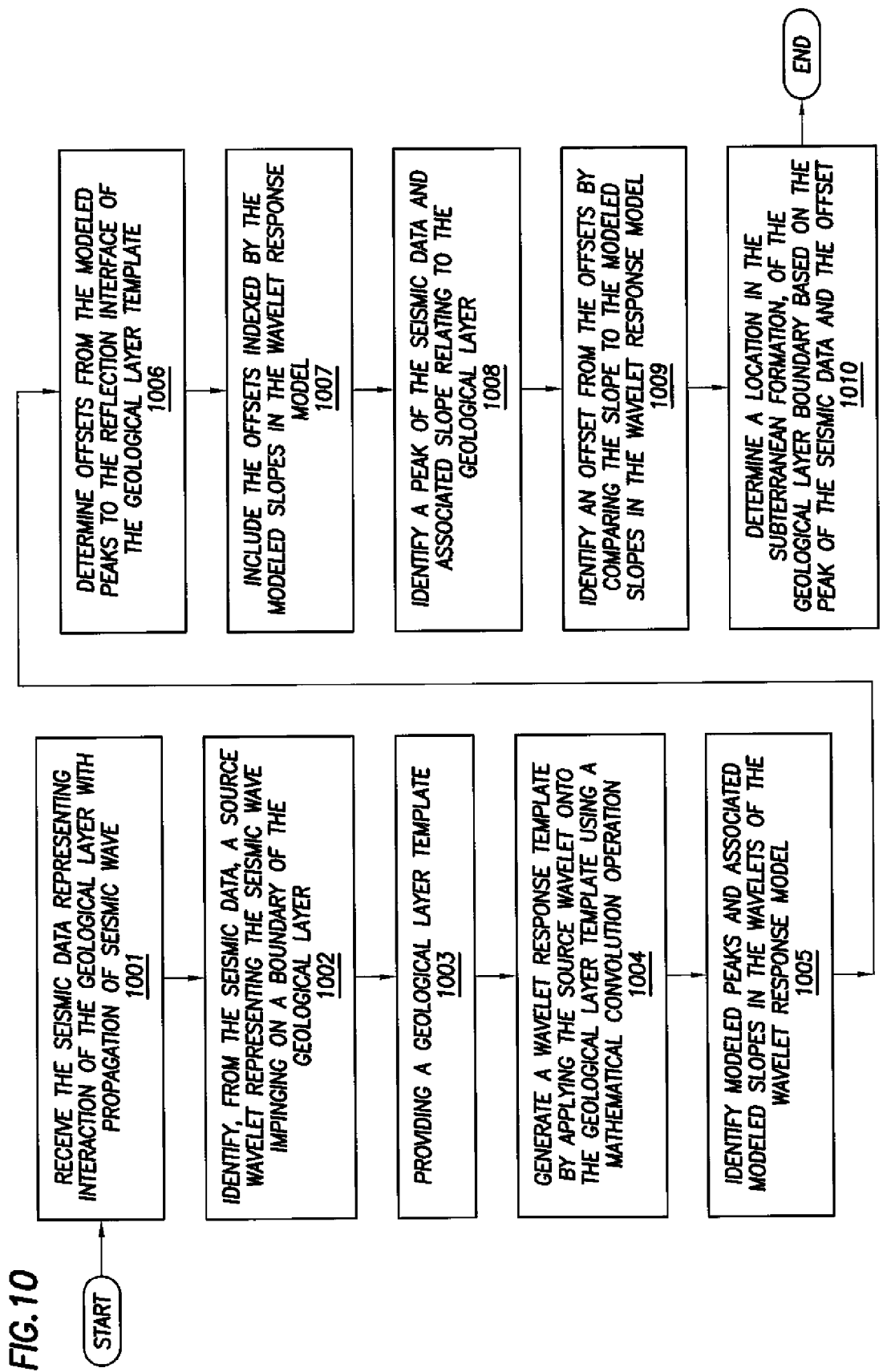
FIG. 10 depicts an example method for determining a position of a geological layer relative to a wavelet response in seismic data in accordance with one or more embodiments.

FIG. 10 depicts an example method for determining a position of a geological layer relative to a wavelet response in seismic data in accordance with one or more embodiments. For example, the method depicted in FIG. 10 may be practiced using the system (200) described in reference to FIG. 2 above for determining the position of the thin formation layer (16) described in reference to FIG. 3 above. In one or more embodiments of the invention, one or more of the elements shown in FIG. 10 may be omitted, repeated, and/or performed in a different order. Accordingly, embodiments of determining a position of a geological layer relative to a wavelet response in seismic data should not be considered limited to the specific arrangements of elements shown in FIG. 10.

Initially in Element 1001, seismic data representing the interaction of the geological layer with a propagation of a seismic wave is received. In one or more embodiments, the seismic data is generated by the seismic data acquisition system (210) and received by the geological layer analysis tool (220) described in reference to FIG. 2 above. For example, the seismic wave may be generated by a seismic source at the surface. In Element 1002, a source wavelet (e.g., source wavelet (30) of FIG. 3) representing the seismic wave impinging on a boundary of the geological layer is identified from the seismic data. In one or more embodiments, the source wavelet is identified based on a user input during seismic interpretation. For example, the seismic data may be processed by the seismic data interpretation system (213) (described in reference to FIG. 2 above) for identifying the source wavelet based on the user input. In one or more embodiments, the seismic source is based on an explosive mechanism and the source wavelet is represented by a Ricker wavelet. In other embodiments, the seismic source may be based on other mechanisms such as air gun, seismic vibrator, etc. and the source wavelet may be represented by other wavelet formats. An example of extracting a source wavelet (e.g., source wavelet (506)) from the seismic data (e.g., the collection of wavelets (505)) is described in reference to FIG. 9 above.

In Element 1003, a geological layer template is provided. Specifically, the geological layer template includes a schematic view of the geological layer of interest without specifying the absolute location and geometry of the geological layer. In particular, the geological layer template includes reflection surfaces corresponding to the boundaries of the geological layer where the distance between the reflection surfaces ranges from a relatively large distance to a relatively small distance as compared to a wavelength of the source wavelet extracted from the seismic data. Further, the reflectivity of the reflection surfaces is determined based on material properties associated with the geological layer. An example geological layer template in schematic form is described in reference to FIG. 3 above.

In Element 1004, a wavelet response template is generated by applying the source wavelet to the geological layer template using a mathematical convolution operation. In one or more embodiments, the wavelet response template is generated by the wavelet response template generator (224) in the geological layer analysis tool (220) described in reference to FIG. 2 above. For example, the mathematical convolution operation may be one of a variety of pre-determined convolution operations used in seismic interpretation and known to those skilled in the art. In one or more embodiments, the wavelet response template is generated by modeling the interaction of the reflection interfaces in the geological layer template with the source wavelet using the mathematical convolution operation. In one or more embodiments, the mathematical convolution operation is performed using the mathematical convolution calculator (225) described in reference to FIG. 2 above. Said in other words, reflections of the source wavelet from the primary reflection interface and the secondary reflection interface are calculated using the mathematical convolution operation. Typically, the wavelet response template includes a collection of modeled wavelets (specifically, composite wavelets) and associated attributes, such as modeled peaks, modeled slope parameters, offsets, etc. Specifically, each of the collection of modeled wavelets is a composite wavelet generated by the mathematical convolution operation corresponding to a particular distance between the reflecting interfaces of the geological layer template. For example, the geological structure (11 of FIG. 3) may be gridded using the seismic data sampling positions to identify reflection points for generating modeled wavelets. An example wavelet response template is described in reference to FIG. 11 and table 1 below.

In Element 1005, a modeled peak and associated modeled slope parameters are identified for each modeled wavelet in the wavelet response template. For example, the modeled peak and associated modeled slope parameters of an example wavelet may be essentially the same as described in reference to FIG. 4 above. In Element 1006, an offset from the modeled peak to a corresponding reflection point on the reflection interface of the geological layer template is determined for each modeled wavelet in the wavelet response template. In Element 1007, the offsets of the collection of the modeled wavelets are indexed by the corresponding modeled slope parameters and included in the wavelet response template. An example organization of modeled peaks, modeled slope parameters, and offsets of the aforementioned example wavelet response template is described in reference to FIG. 11 and table 1 below. In one or more embodiments, the slope parameters and offsets are generated by the wavelet response template generator (224), in particular the slope parameters analyzer (226), in the geological layer analysis tool (220) described in reference to FIG. 2 above.

In one or more embodiments, the wavelet response template constructed in Elements 1004 through 1007 above is used to adjust the apparent position of a thin layer during seismic interpretation. In Element 1008, a peak and associated slopes related to the geological layer are identified in the seismic data during seismic interpretation. In one or more embodiments, the peak is identified using the seismic data interpretation system (213) described in reference to FIG. 2 above. In Element 1009, a parameter (e.g., magnitude, vertical position on the wavelet, horizontal position on the wavelet, etc.) of the slope is used to look up a corresponding offset from the wavelet response template. Specifically, the slope parameter is compared with entries in the wavelet response template to find a matching parameter value in an entry where the offset in the entry is retrieved. Accordingly, the apparent position of the geological layer, typically determined by the peak identified in the seismic data, is adjusted using the offset retrieved from the wavelet response template. Using the adjustment described above, the location of the geological layer can be determined even when the thickness is near or less than a quarter of the wavelength of the seismic wave. In one or more embodiments, the aforementioned adjustment is performed using the seismic interpretation adjustment module (227) in the geological layer analysis tool (220) described in reference to FIG. 2 above.

Figure 11:
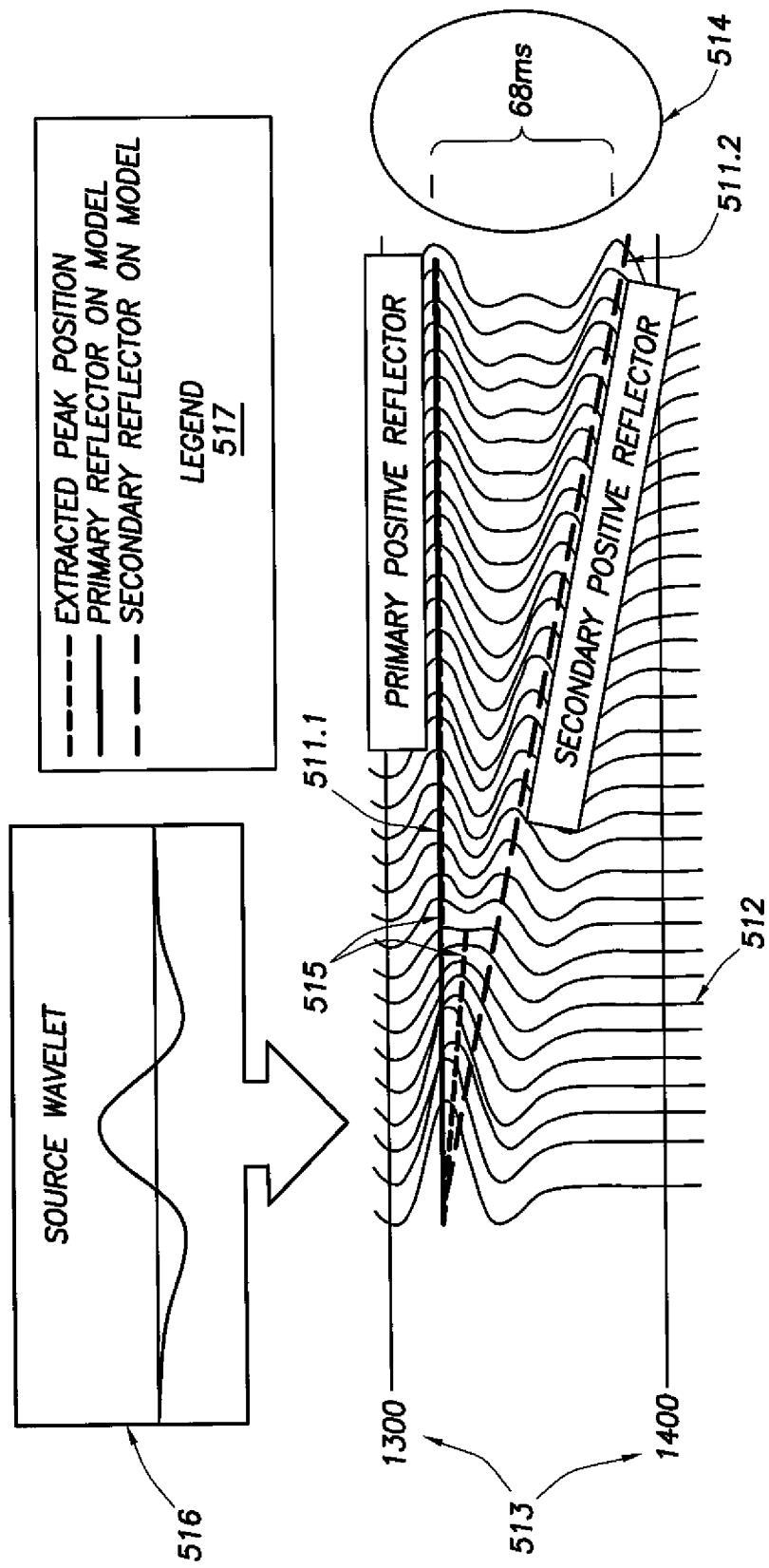
FIGS. 11 and 12 depict an application example for determining a position of a geological layer relative to a wavelet response in seismic data in accordance with one or more embodiments.
Figure 12:
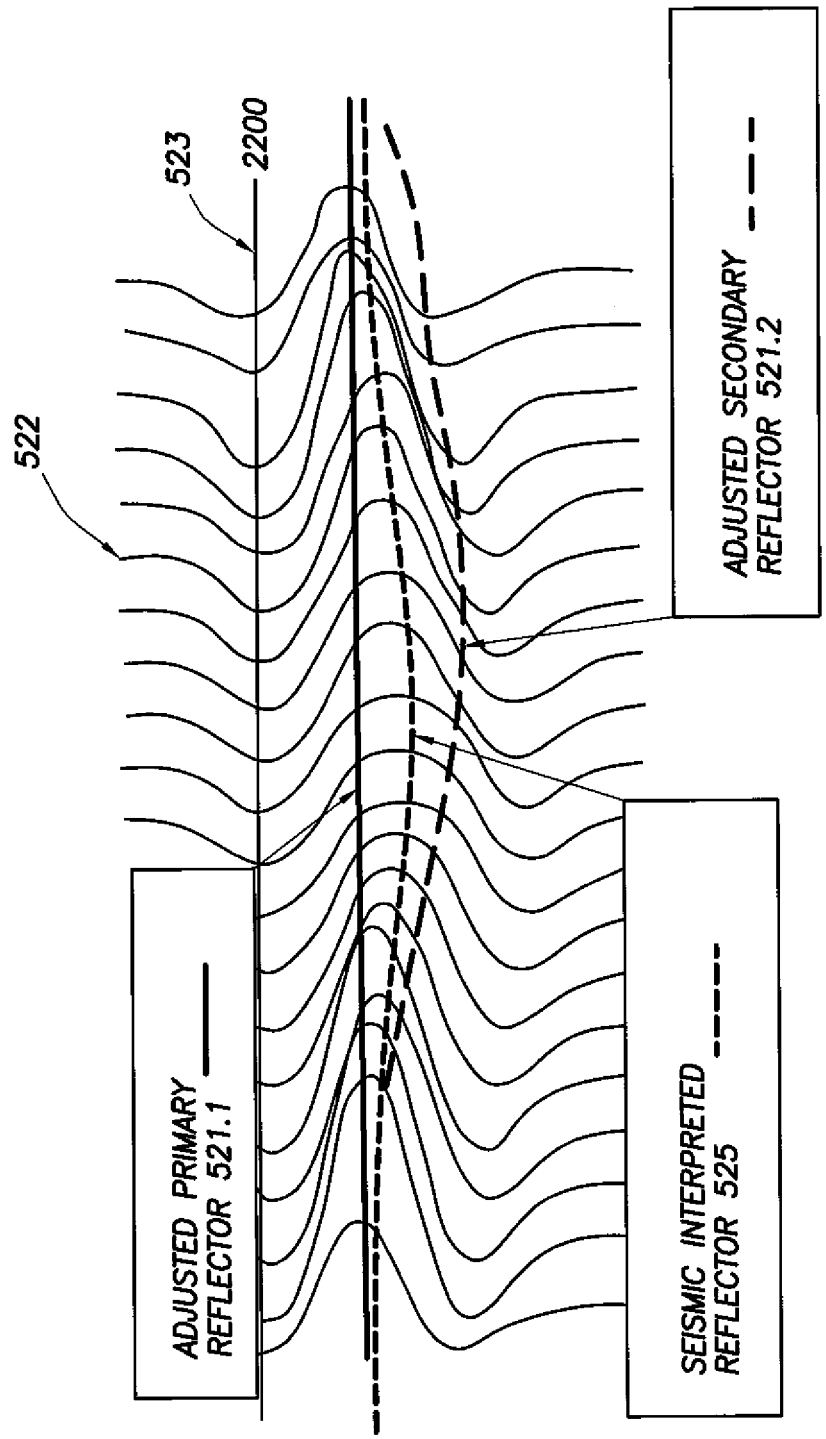

FIGS. 11 and 12 depict an applied example for determining a position of a geological layer relative to a wavelet response in seismic data in accordance with one or more embodiments. Specifically, FIG. 11 shows a geological layer template having a primary boundary (511.1) and a secondary boundary (511.2) within a depth range corresponding to a range (513) of seismic data sampling positions between 1300 ms and 1400 ms. As noted above, the actual depth location of 1300 ms and 1400 ms are arbitrary in this example and do not influence the use of the wavelet response template. In this example, both the primary boundary (511.1) and secondary boundary (511.2) act as positive reflectors as determined by material properties above, within, and beneath the boundaries (511.1) and (511.2). The distance between the boundaries (511.1) and (511.2), referred to as template thickness, varies between a range of 68 ms at the right side (514) of the layer to 0 ms at the left side of the layer. As is known to those skilled in the art, the distance, depth, or thickness can be represented in either a time domain or a depth domain, which are convertible based on seismic wave propagation velocity.

Further as shown in FIG. 11, a source wavelet having a waveform as a Ricker wavelet (516) is applied to the geological layer template to generate a collection of modeled wavelets, such as the modeled wavelet (512) that is plotted vertically and placed along the horizontal axis corresponding to a reflection point along the length of the geological layer template. Specifically, the Ricker wavelet (516) is applied to the primary positive reflector (511.1) and the secondary positive reflector (511.2) using the aforementioned mathematical convolution operators to calculate the resultant modeled wavelets produced by the interference effects between the primary reflected signal and the secondary reflected signal exemplarily depicted in FIG. 3 above. Accordingly, the modeled peaks of the modeled wavelets are identified and represented as two line segments (515) of which one line segment is shown to essentially coincide with the primary boundary (511.1). The extracted modeled peaks and the primary and the secondary reflectors are identified in FIG. 11 based on the legend (517). Various attributes of the modeled wavelets are extracted and tabulated in Table 1 below. In Table 1, the first and second columns show the modeled slope magnitudes derived on the primary reflected signal portion of the modeled wavelets (each of which is a composite wavelet), where "Max1" denotes the positive going slope and "Max2" denotes the negative going slope. Said in other words, "Max1." and "Max2" slopes are essentially the same as the slope (52) and slope (54) as discussed in reference to FIG. 4 above. Further as shown in Table 1, the third column shows corresponding depth positions of the modeled peaks, the fourth column shows corresponding depth positions of the primary reflector in the geological layer template, the fifth column shows offsets between the modeled peaks to corresponding depth positions on the primary reflector, the sixth column shows the depth position of the secondary reflector, the seventh column shows the offsets between the modeled peaks to corresponding depth positions on the secondary reflector, and the eighth column shows the template thickness, which is the difference between the depth positions of the primary and secondary reflectors in the geological layer template. For example, the values in Table 1 may be obtained from the example discussed in reference to FIGS. 4-8 above. In one or more embodiments, the number of entries in Table 1 or the wavelet response template is determined based on a pre-determined criterion dictated by the look up method described in reference to FIG. 12 below. For example, while each entry corresponds to a seismic data sampling position overlaying the geological layer template, the sampling interval may be adjusted to result in a sufficient number of entries in the wavelet response template to facilitate the look up method described in reference to FIG. 12 below. While the example wavelet response template depicted in this example includes absolute positions of the modeled peaks and primary and secondary reflectors, both of the modeled slope parameters and the offsets indexed thereby are only dependent on relative positions and are independent of the absolute positions in the geological layer template.

Although the example given above describe a source wavelet having a waveform represented by Ricker wavelet and applied to a geological layer template having a progressively thickening wedge shape with linear boundaries, one skilled in the art with the benefit of this disclosure will appreciate that the source wavelet and the geological layer template may assume other forms than those described herein without deviating from the essence of this disclosure.

the interpreted peak included in the third column of Table 2. As shown, each row entry in Table 2 corresponds to one of the wavelets in FIG. 12. Accordingly, slope magnitudes for each interpreted peak from a row entry are compared for a match to entries in Table 1, which is used as a look up table for identifying corresponding modeled offsets from the primary reflection surface and modeled offsets from the secondary reflection surface. In one or more embodiments, if no matching entry is available (e.g., no entry includes a modeled slope parameter with a matching value to the slope magnitude of an interpreted peak); additional entries may be created in the wavelet response template to facilitate the look up. For example, additional reflection points along the reflecting interfaces in the geological layer template may be identified for applying the source wavelet to generate a modeled wavelet using the mathematical convolution operation as described above.

As shown, the modeled offsets from the primary reflection surface and modeled offsets from the secondary reflection surface retrieved by looking up from Table 1 are included in the fourth and sixth columns of Table 2. Accordingly, depth positions of the adjusted primary reflector (521.1) and depth positions of the adjusted secondary reflector (521.2) are calculated by applying the modeled offsets in the fourth and sixth columns to the depth positions of the interpreted peaks in the third column. The results are included in the fifth column and the seventh column of Table 2. In addition, a thickness value is calculated by subtracting a value in the fifth column from a value in the seventh column, which is then included in the eight column of Table 2. The thickness values may be used as predicted thickness of the geological layer. The values in the fifth column and seventh column of Table 2 are plotted in FIG. 12 as adjusted primary reflector (521.1) and adjusted secondary reflector (521.2), respectively. The adjusted reflectors (521.1) and (521.2) may be used as predicted boundaries of the geological layer.

TABLE 1

| Slopes derived on Primary | | Position of Peak/Trough to Modeled Reflectors | | | | | Template |
| --- | --- | --- | --- | --- | --- | --- | --- |
| Max1 | Max2 | PEAK | Primary | Delta | Secondary | Delta | Thickness |
| 10.000 | −10.000 | 1320.000 | 1319.000 | −1.00 | 1321.000 | +1.00 | 2 |
| 8.000 | −10.000 | 1321.000 | 1319.000 | −2.00 | 1323.000 | +2.00 | 4 |
| 7.000 | −8.000 | 1322.000 | 1319.000 | −3.00 | 1325.000 | +3.00 | 6 |
| 6.000 | −7.000 | 1323.000 | 1319.000 | −4.00 | 1327.000 | +4.00 | 8 |
| 5.000 | −5.000 | 1324.000 | 1319.000 | −5.00 | 1329.000 | +5.00 | 10 |
| 4.000 | −3.000 | 1325.000 | 1319.000 | −6.00 | 1331.000 | +6.00 | 12 |

FIG. 12 shows a seismic interpretation example where interpreted peaks in the seismic data indicative of a subterranean geological layer are adjusted based on offsets retrieved from the wavelet response template shown in Table 1 above. In particular, the seismic data shown in FIG. 12 includes wavelets plotted along the vertical direction and positioned along seismic data sampling positions in the horizontal direction. As shown, the example seismic data is located generally near a depth of 2200 ms with an interpreted reflector (525) identified during the seismic interpretation workflow. In one or more embodiments, slope magnitudes of each wavelet (e.g., wavelet (522)) are extracted and included in first and second columns of Table 2 below with the depth position of

TABLE 2

| Primary Slopes | | | Position of Peak/Trough to Seismic Reflectors | | | | |
| --- | --- | --- | --- | --- | --- | --- | --- |
| Max1 | Max2 | PEAK | Model Delta | Result Primary | Model Delta | Result Secondary | Thickness |
| 10.0 | −10.0 | 2220.0 | −1.0 | 2219.0 | 1.0 | 1321.0 | 2 |
| 8.0 | −10.0 | 2221.0 | −2.0 | 2219.0 | 3.0 | 1323.0 | 4 |
| 7.0 | −8.0 | 2222.0 | −3.0 | 2219.0 | 5.0 | 1325.0 | 6 |
| 6.0 | −7.0 | 2223.0 | −4.0 | 2219.0 | 7.0 | 1327.0 | 8 |
| 8.0 | −10.0 | 2221.0 | −2.0 | 2219.0 | 5.0 | 1323.0 | 4 |
| 10.0 | −10.0 | 2220.0 | −1.0 | 2219.0 | 3.0 | 1321.0 | 2 |

Although the descriptions above relate to interpreted peaks in the seismic data, those skilled in the art with the benefit of this disclosure will appreciate that interpreted troughs in the seismic data can also be used. Accordingly, embodiments of determining a position of a geological layer relative to a wavelet response in seismic data may be used with respect to interpreted peaks, interpreted troughs, and/or combinations thereof, all of which are referred to as interpreted extrema (singular: extremum).

Figure 13:
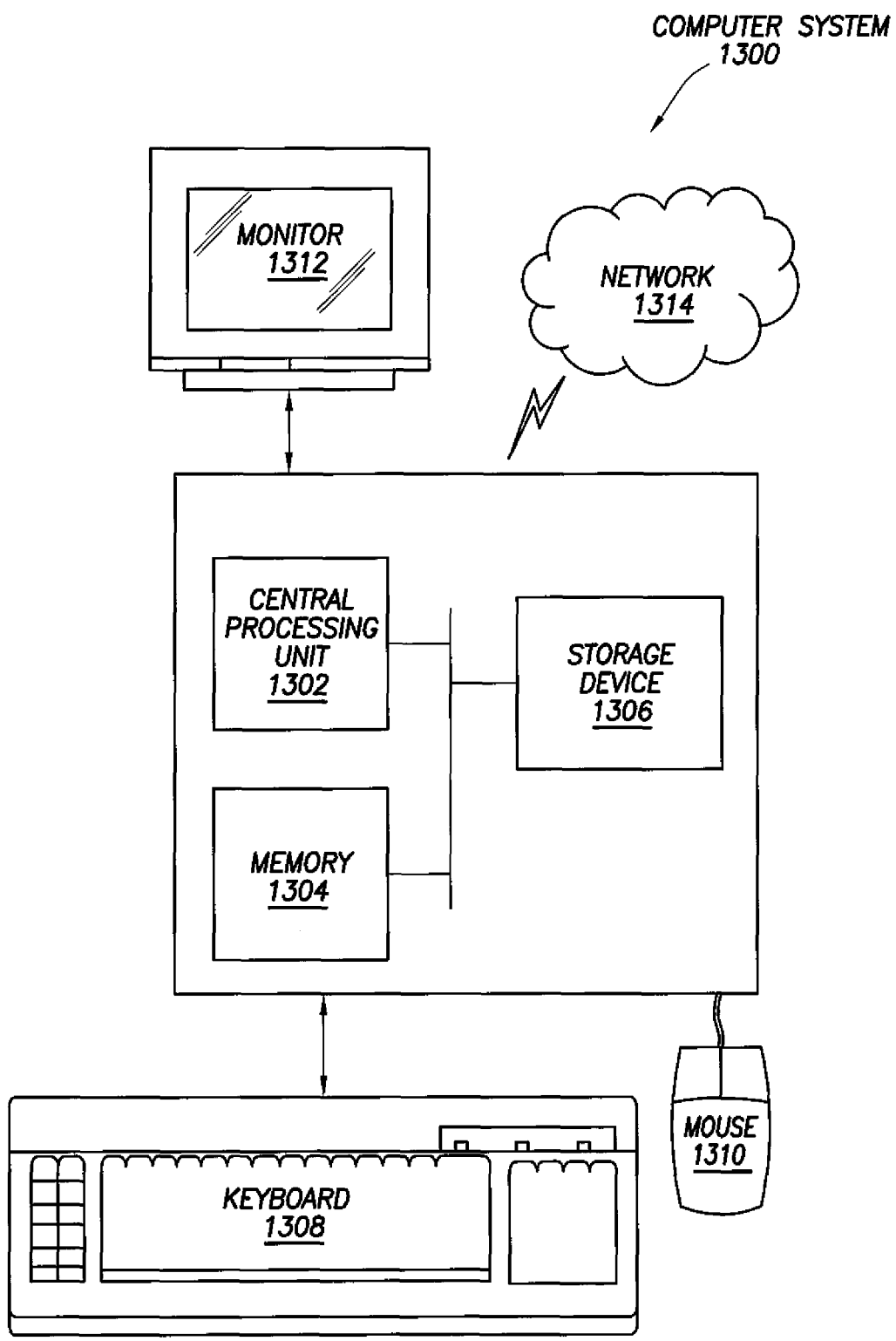
FIG. 13 depicts a computer system in which one or more embodiments of determining a position of a geological layer relative to a wavelet response in seismic data may be implemented.

Embodiments of determining a position of a geological layer relative to a wavelet response in seismic data may be implemented on virtually any type of computer regardless of the platform being used. For instance, as shown in FIG. 13, a computer system (1300) includes one or more processor(s) (1302) such as an integrated circuit, CPU, or other hardware processor, associated memory (1304) (e.g., random access memory (RAM), cache memory, flash memory, etc.), a storage device (1306) (e.g., a hard disk, an optical drive such as a compact disk drive or digital video disk (DVD) drive, a flash memory stick, etc.), and numerous other elements and functionalities typical of today's computers (not shown). The computer (1300) may also include input means, such as a keyboard (1308), a mouse (1310), or a microphone (not shown). Further, the computer (1300) may include output means, such as a monitor (1312) (e.g., a liquid crystal display LCD, a plasma display, or cathode ray tube (CRT) monitor). The computer system (1300) may be connected to a network (1314) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (1300) includes at least the minimal processing, input, and/or output means necessary to practice one or more embodiments.

Further, those skilled in the art will appreciate that one or more elements of the aforementioned computer system (1300) may be located at a remote location and connected to the other elements over a network. Further, one or more embodiments may be implemented on a distributed system having a plurality of nodes, where each portion of the implementation (e.g., the seismic interpretation tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a non-transitory computer readable storage medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials from other fields. Further, portions of the systems and methods may be implemented as software, hardware, firmware, or combinations thereof.

While the invention has been described with respect to a limited number of embodiments, those skilled in the art, having benefit of this disclosure, will appreciate that other embodiments may be devised which do not depart from the scope of the invention may be implemented as disclosed herein. Accordingly, the invention should be limited only by the attached claims.

What is claimed is:

1. A method for determining a location of a geological layer in a subterranean formation from seismic data, comprising:
   receiving the seismic data representing an interaction of the geological layer with propagation of a seismic wave;
   identifying, from the seismic data, a source wavelet representing a portion of the seismic wave impinging on a boundary of the geological layer;
   providing a geological layer template of the geological layer comprising primary and secondary reflection interfaces associated with reflectivity based on material properties of the geological layer;
   generating, by a computer processor using a mathematical convolution operation, a plurality of modeled slope parameters by applying the source wavelet to the geological layer template;
   generating a wavelet response table comprising the plurality of modeled slope parameters to model a seismic wave interference caused by the primary and secondary reflection interfaces;
   calculating a slope associated with an extremum of the seismic data; and
   determining, by at least comparing the slope associated with the extremum of the seismic data to the plurality of modeled slope parameters, the location of the geological layer in the subterranean formation using the wavelet response table.

2. The method of claim 1, wherein the plurality of modeled slope parameters are extracted from a plurality of modeled composite wavelets generated by the mathematical convolution operation, further comprising:
   identifying a plurality of modeled extrema in the plurality of modeled composite wavelets;
   determining the plurality of modeled slope parameters associated with the plurality of modeled extrema;
   determining a plurality of offsets between the plurality of modeled extrema and at least one selected from a group consisting of the primary and secondary reflection interfaces of the geological layer template; and
   including the plurality of offsets indexed by the plurality of modeled slope parameters in the wavelet response table.

3. The method of claim 2, further comprising:
   identifying the extremum of the seismic data and a location of the extremum;
   identifying an offset from the plurality of offsets by comparing the slope to the plurality of modeled slope parameters in the wavelet response table; and
   applying the offset to the location of the extremum to determine the location of the geological layer in the subterranean formation.

4. The method of claim 2, wherein a modeled slope parameter of the plurality of modeled slope parameters comprises at least one selected from a group consisting of a magnitude of a slope, a seismic amplitude associated with the slope, and a seismic sample position associated with the slope, wherein the slope is identified based on a pre-determined criterion of a modeled composite wavelet of the plurality of modeled composite wavelets.

5. The method of claim 4, wherein the modeled slope parameter is determined relative to a corresponding slope on the source wavelet.

6. The method of claim 1, wherein a thickness of the geological layer is less than one quarter of a wavelength of the source wavelet.

7. A system for determining a location of a geological layer in a subterranean formation from seismic data, comprising:
a seismic source configured to generate a seismic wave propagating through the subterranean formation;
a seismic receiver configured to sense the seismic wave and generate the seismic data representing an interaction of the geological layer with propagation of the seismic wave;
a source wavelet analyzer executing on a processor and configured to identify, from the seismic data, a source wavelet representing a portion of the seismic wave impinging on a boundary of the geological layer;
a geological layer template initializer executing on the processor and configured to initialize reflectivity in a geological layer template based on material properties associated with the geological layer, wherein the geological layer template comprises primary and secondary reflection interfaces;
a wavelet response template generator executing on the processor and comprising:
a mathematical convolution calculator executing on the processor and configured to:
generate a plurality of modeled composite wavelets by applying the source wavelet to the geological layer template to model seismic wave interference caused by the primary and secondary reflection interfaces; and
a slope parameter analyzer executing on the processor and configured to:
identify a plurality of modeled extrema in the plurality of modeled composite wavelets;
determine a plurality of modeled slope parameters associated with the plurality of modeled extrema;
determine a plurality of offsets between the plurality of modeled extrema and at least one selected from a group consisting of the primary and secondary reflection interfaces of the geological layer template; and
include the plurality of offsets indexed by the plurality of modeled slope parameters in a wavelet response template; and
a memory storing instructions that when executed by the processor comprise functionality to:
identify an extremum of the seismic data associated with the geological layer; and
determine, from the extremum of the seismic data, the location of the geological layer based on the wavelet response template.

8. The system of claim 7, the instructions when executed by the processor further comprising functionality to:
identify a slope associated with the extremum of the seismic data;
identify an offset from the plurality of offsets by comparing the slope to the plurality of modeled slope parameters in the wavelet response template; and
determine a location of the boundary of the geological layer in the subterranean formation based on the extremum of the seismic data and the offset.

9. The system of claim 7, wherein applying the source wavelet to the geological layer template comprises modeling reflections of the source wavelet from the primary and secondary reflection interfaces.

10. The system of claim 7, wherein a modeled slope parameter of the plurality of modeled slope parameters comprises at least one selected from a group consisting of a magnitude of a slope, a seismic amplitude associated with the slope, and a seismic sample position associated with the slope, wherein the slope is identified based on a pre-determined criterion of a modeled composite wavelet of the plurality of modeled composite wavelets.

11. The system of claim 10, wherein the modeled slope parameter is determined relative to a corresponding slope on the source wavelet.

12. The system of claim 10, wherein a thickness of the geological layer is less than one quarter of a wavelength of the source wavelet.

13. A non-transitory computer readable storage medium comprising instructions for determining a location of a geological layer in a subterranean formation from seismic data, the instructions when executed causing a processor to:
receive the seismic data representing an interaction of the geological layer with propagation of a seismic wave;
identify, from the seismic data, a source wavelet representing a portion of the seismic wave impinging on a boundary of the geological layer;
provide a geological layer template of the geological layer comprising primary and secondary reflection interfaces associated with reflectivity based on material properties of the geological layer;
generate, using a mathematical convolution operation, a plurality of modeled slope parameters by applying the source wavelet to the geological layer template;
generate a wavelet response table comprising the plurality of modeled slope parameters to model a seismic wave interference caused by the primary and secondary reflection interfaces;
calculate a slope associated with an extremum of the seismic data; and
determine, by at least comparing the slope associated with the extremum of the seismic data to the plurality of modeled slope parameters, the location of the geological layer in the subterranean formation using the wavelet response table.

14. The non-transitory computer readable storage medium of claim 13, wherein the plurality of modeled slope parameters are extracted from a plurality of modeled composite wavelet generated by the mathematical convolution operation, the instructions when executed further causing the processor to:
identify a plurality of modeled extrema in the plurality of modeled composite wavelets;
determine the plurality of modeled slope parameters associated with the plurality of modeled extrema;
determine a plurality of offsets between the plurality of modeled extrema and at least one selected from a group consisting of the primary and secondary reflection interfaces of the geological layer template; and
include the plurality of offsets indexed by the plurality of modeled slope parameters in the wavelet response table.

15. The non-transitory computer readable storage medium of claim 14, further comprising instructions for causing the processor to:
identify the extremum of the seismic data and a location of the extremum;
identify an offset from the plurality of offsets by comparing the slope to the plurality of modeled slope parameters in the wavelet response table; and
apply the offset to the location of the extremum to determine the location of the geological layer in the subterranean formation.

16. The non-transitory computer readable storage medium of claim 14, wherein a modeled slope parameter of the plurality of modeled slope parameters comprises at least one selected from a group consisting of a magnitude of a slope, a seismic amplitude associated with the slope, and a seismic sample position associated with the slope, wherein the slope is identified based on a pre-determined criterion of a modeled composite wavelet of the plurality of modeled composite wavelets.

17. The non-transitory computer readable storage medium of claim 16, wherein the modeled slope parameter is determined relative to a corresponding slope on the source wavelet.

18. The non-transitory computer readable storage medium of claim 13, wherein a thickness of the geological layer is less than one quarter of a wavelength of the source wavelet.

\* \* \* \* \*